(12) United States Patent
Oshima et al.

(10) Patent No.: US 12,034,124 B2
(45) Date of Patent: Jul. 9, 2024

(54) SOLID STATE BATTERY COMPRISING A CONCAVOCONVEX SHAPE

(71) Applicant: Murata Manufacturing Co., Ltd., Nagaokakyo (JP)

(72) Inventors: Kenji Oshima, Nagaokakyo (JP); Makoto Yoshioka, Nagaokakyo (JP); Osamu Chikagawa, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 715 days.

(21) Appl. No.: 17/319,251

(22) Filed: May 13, 2021

(65) Prior Publication Data

US 2021/0265667 A1 Aug. 26, 2021

Related U.S. Application Data

(63) Continuation of application No. PCT/JP2019/043472, filed on Nov. 6, 2019.

(30) Foreign Application Priority Data

Nov. 16, 2018 (JP) .................. 2018-215566

(51) Int. Cl.
*H01M 10/0585* (2010.01)
*H01M 4/02* (2006.01)
*H01M 10/0562* (2010.01)

(52) U.S. Cl.
CPC ... *H01M 10/0585* (2013.01); *H01M 10/0562* (2013.01); *H01M 2004/021* (2013.01);
(Continued)

(58) Field of Classification Search
CPC ......... H01M 10/0585; H01M 10/0562; H01M 2004/021; H01M 2004/025; H01M 2300/0065
See application file for complete search history.

(56) References Cited

U.S. PATENT DOCUMENTS 9,728,343 B2 8/2017 Horikawa et al.
2013/0017435 A1 1/2013 Sato et al.
(Continued)

FOREIGN PATENT DOCUMENTS

EP 2975671 B1 1/2018
JP 2011216235 A 10/2011
(Continued)

OTHER PUBLICATIONS

Written Opinion of the International Search Authority issued for PCT/JP2019/043472, date of mailing Feb. 4, 2020.
(Continued)

*Primary Examiner* — Christopher P Domone
*Assistant Examiner* — Kimberly Wyluda
(74) *Attorney, Agent, or Firm* — ArentFox Schiff LLP

(57) ABSTRACT

A solid state battery having a laminated structure with one or more positive electrode layers and one or more negative electrode layers alternately stacked with a solid electrolyte layer interposed therebetween; a positive end surface electrode electrically connected to the one or more positive electrode layers; and a negative end surface electrode electrically connected to the one or more negative electrode layers, wherein (1) at least one positive electrode layer has a concavoconvex shape in a plan view thereof at an end on a side thereof that is electrically connected to the positive end surface electrode, and/or (2) at least one negative electrode layer has a concavoconvex shape in a plan view thereof at an end on a side thereof that is electrically connected to the negative end surface electrode.

19 Claims, 12 Drawing Sheets

(52) U.S. Cl.
CPC ............... *H01M 2004/025* (2013.01); *H01M 2300/0065* (2013.01)

(56) References Cited

U.S. PATENT DOCUMENTS

| | | |
|---|---|---|
| 2014/0106213 A1 | 4/2014 | Horikawa et al. |
| 2018/0062212 A1 | 3/2018 | Kim et al. |
| 2019/0051935 A1 | 2/2019 | Okamoto et al. |
| 2021/0075065 A1* | 3/2021 | Sera ................. H01M 4/04 |

FOREIGN PATENT DOCUMENTS

| | | | |
|---|---|---|---|
| JP | 2012226862 A | 11/2012 | |
| JP | 2014006965 A | 1/2014 | |
| JP | 2014120372 A | 6/2014 | |
| KR | 20180118619 1 | 10/2018 | |
| WO | 2018181545 A1 | 10/2008 | |
| WO | 2013001908 A1 | 1/2013 | |

OTHER PUBLICATIONS

International Search Report issued for PCT/JP2019/043472, date of mailing Feb. 4, 2020.

\* cited by examiner

FIG. 5A – PRIOR ART
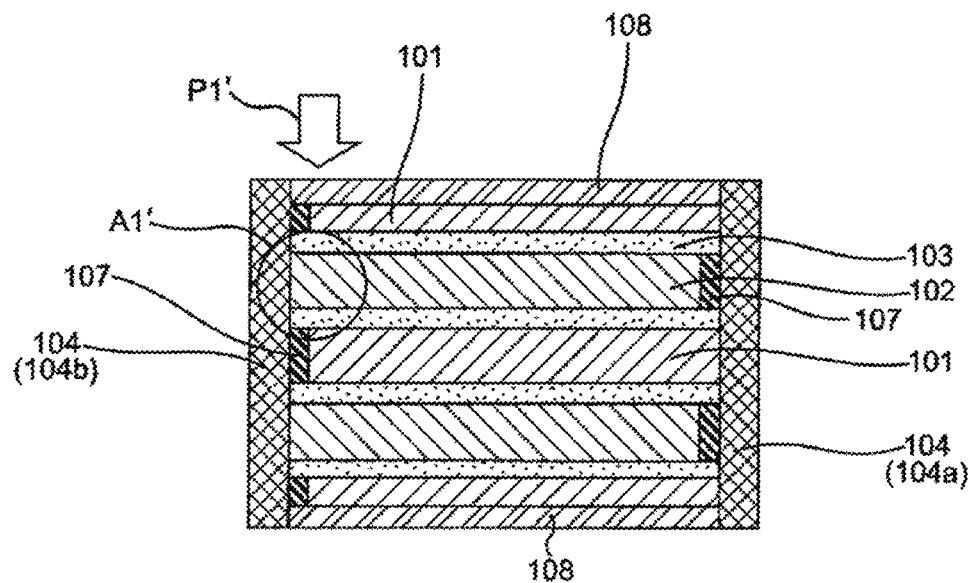
FIG. 5B – PRIOR ART
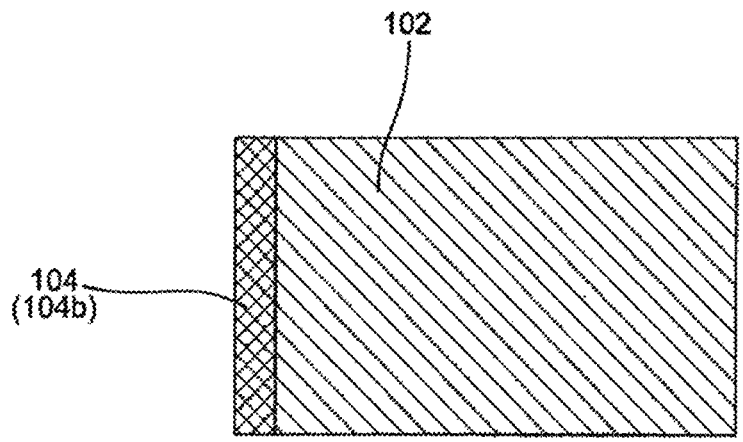

FIG. 6A – PRIOR ART
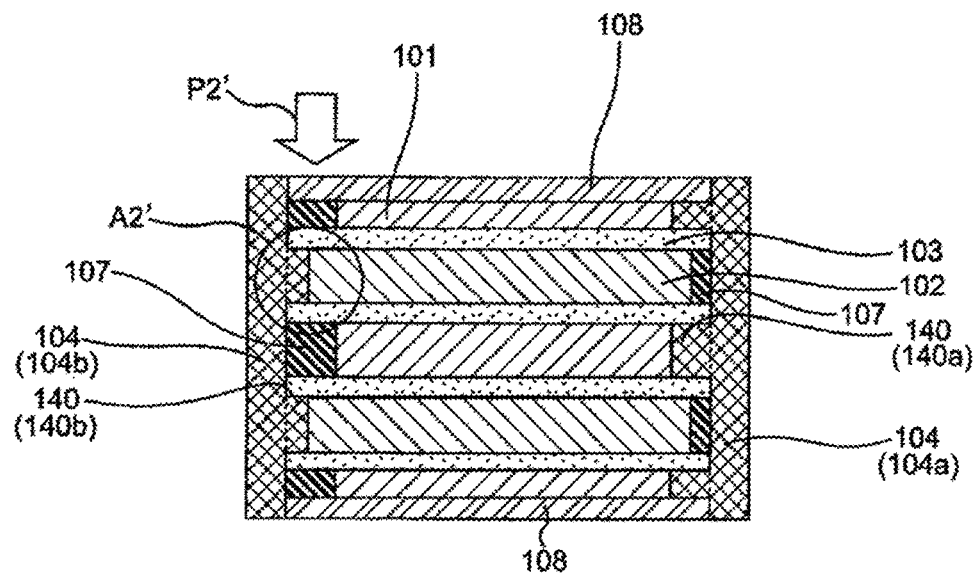
FIG. 6B – PRIOR ART
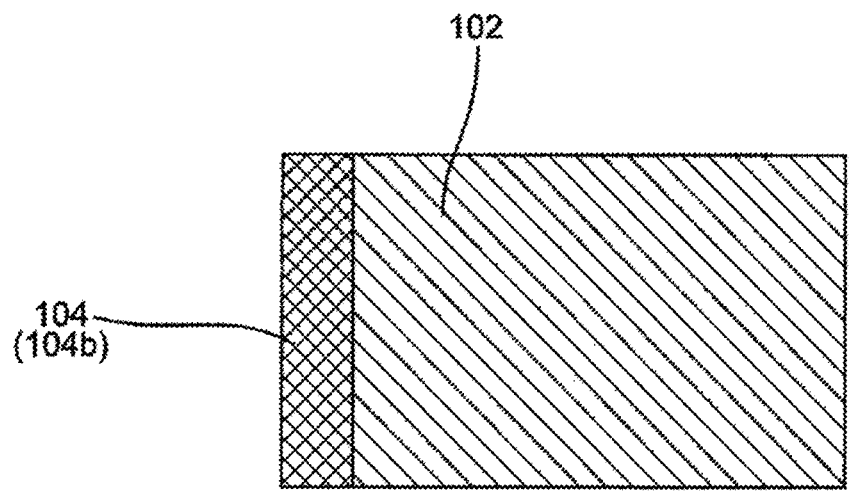

FIG. 7A – PRIOR ART
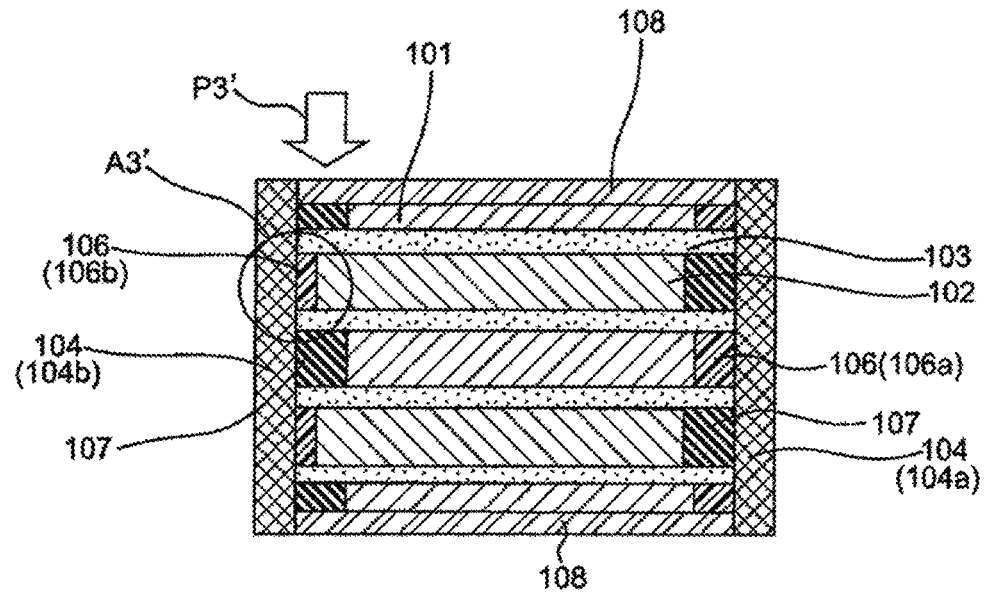
FIG. 7B – PRIOR ART
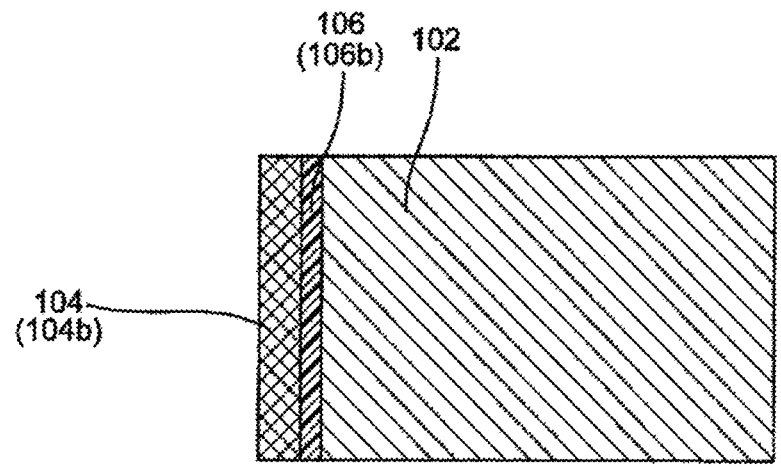

FIG. 8A – PRIOR ART
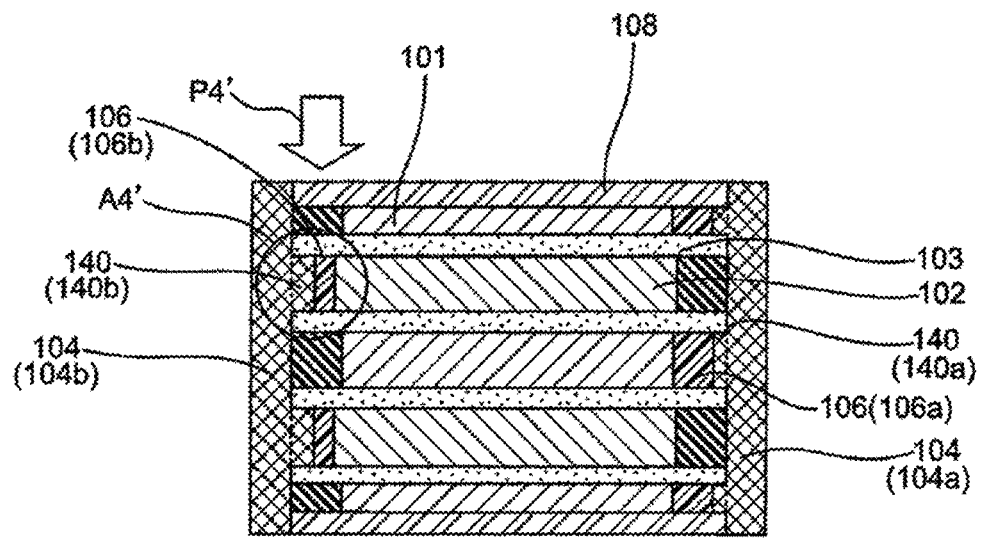
FIG. 8B – PRIOR ART
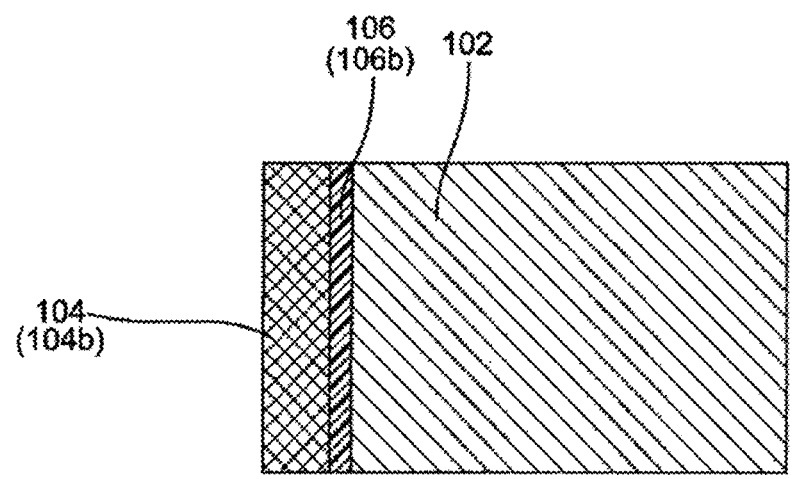

SOLID STATE BATTERY COMPRISING A CONCAVOCONVEX SHAPE

CROSS REFERENCE TO RELATED APPLICATIONS

The present application is a continuation of International application No. PCT/JP2019/043472, filed Nov. 6, 2019, which claims priority to Japanese Patent Application No. 2018-215566, filed Nov. 16, 2018, the entire contents of each of which are incorporated herein by reference.

FIELD OF THE INVENTION

The present invention relates to a solid state battery.

BACKGROUND OF THE INVENTION

In recent years, the demand has been expanded for batteries as power sources for portable electronic devices such as cellular phones and portable personal computers. In the batteries for use in such applications, electrolytes (electrolytic solutions) such as organic solvents have been conventionally used as media for moving ions. However, the batteries configured above are at risk of causing the electrolytic solutions to leak out. In addition, the organic solvents or the like for use in the electrolytic solutions are flammable materials. For this reason, there has been a need to increase the safety of the batteries.

Therefore, in order to increase the safety of the batteries, a study of a solid state battery using solid electrolytes as the electrolytes, in place of electrolytic solutions has been made.

As the solid state battery, for example, Patent Documents 1 to 3 disclose a solid state battery having a laminated structure in which one or more positive electrode layers and one or more negative electrode layers are alternately stacked with a solid electrolyte layer interposed therebetween, and the solid state battery has an end face electrode on an end face of the laminated structure.

Patent Document 1: Japanese Patent Application Laid-Open No. 2011-216235
Patent Document 2: Japanese Patent Application Laid-Open No. 2014-120372
Patent Document 3: WO2013/001908A

SUMMARY OF THE INVENTION

However, from the viewpoint of improving energy density of the solid state battery, the inventors of the present invention have found that battery characteristics deteriorate when a current collector layer and a current collector (for example, foil) are omitted and an electrode layer has a function as an electrode and a function as the current collector layer or the current collector.

Specifically, as the solid state battery in which the current collector layer and the current collector (for example, silver) are omitted, for example, as shown in FIG. 5A, there has been known a solid state battery having a laminated structure in which one or more positive electrode layers 101 and one or more negative electrode layers 102 are alternately stacked with a solid electrolyte layer 103 interposed therebetween, and the solid state battery has an end face electrode 104 (104a, 104b) on an end face of the laminated structure. In FIG. 5A, reference numeral 107 represents a so-called insulating layer, which may be a spatial layer. Reference numeral 108 indicates a protective layer. In such a solid state battery, as shown in FIG. 5B, the negative electrode layer 102 is electrically connected to the end face electrode 104b at an end on the end face electrode 104b side in a plane perpendicular to a horizontal plane. The positive electrode layer 101 is connected to the end face electrode 104a at an end on the end face electrode 104a side in the plane perpendicular to the horizontal plane. Therefore, it has been found that poor connection between the electrode layers 101 and 102 and the end face electrode 104 is likely to occur, and as a result, the battery characteristics deteriorate. FIG. 5A is a schematic sectional view of an example of a solid state battery according to the prior art. FIG. 5B is an enlarged schematic view of the negative electrode layer when an A1' portion is viewed in a P1' direction (that is, vertically downward direction) in FIG. 5A.

Thus, as shown in FIG. 6A, an attempt has been made to provide a take-out portion 140 (140a, 140b) at the end face electrode 104 (104a, 104b) to suppress poor connection between the electrode layers 101 and 102 and the end face electrode 104. However, as shown in FIGS. 6A and 6B, the positive electrode layer 101 and the negative electrode layer 102 are connected respectively to the take-out portions 140a and 140b of the end face electrodes 104a and 104b at the ends on the sides of the end face electrodes 104a and 104b in the plane perpendicular to the horizontal plane, and therefore, poor connection between the electrode layers 101 and 102 and the end face electrode 104 is also likely to occur. FIG. 6A is a schematic sectional view of another example of the solid state battery according to the prior art. FIG. 6B is an enlarged schematic view of the negative electrode layer when an A2' portion is viewed in a P2' direction (that is, vertically downward direction) in FIG. 6A.

As shown in FIG. 7A, an attempt has been made to interpose a bonding site 106 (106a, 106b) between the positive electrode layer 101 and the negative electrode layer 102 and the end face electrode 104 (104a, 104b) to suppress poor connection between the electrode layers 101 and 102 and the end face electrode 104. However, as shown in FIGS. 7A and 7B, the positive electrode layer 101 and the negative electrode layer 102 are connected respectively to the joint portions 106a and 106b at the ends on the sides of the end face electrodes 104a and 104b in the plane perpendicular to the horizontal plane: therefore, poor connection between the electrode layers 101 and 102 and the joint portion 106 is likely to occur, and as a result, poor connection between the electrode layers 101 and 102 and the end face electrodes 104a and 104b is also likely to occur. FIG. 7A is a schematic sectional view of another example of the solid state battery according to the prior art. FIG. 7B is an enlarged schematic view of the negative electrode layer when an A3' portion is viewed in a P3' direction (that is, vertically downward direction) in FIG. 7A.

In addition, as shown in FIG. 8A, an attempt has been made to provide the take-out portion 140 (140a, 140b) at the end face electrode 104 (104a, 104b) and interpose the joint portion 106 (106a and 106b) between the take-out portion 140 and the positive electrode layer 101 and the negative electrode layer 102 to suppress poor connection between the electrode layers 101 and 102 and the end face electrode 104. However, as shown in FIGS. 8A and 8B, the positive electrode layer 101 and the negative electrode layer 102 are connected respectively to the joint portions 106a and 106b at the ends on the sides of the end face electrodes 104a and 104b in the plane perpendicular to the horizontal plane; therefore, poor connection between the electrode layers 101 and 102 and the joint portion 106 is likely to occur, and as a result, poor connection between the electrode layers 101 and 102 and the end face electrodes 104a and 104b is also likely to occur. FIG. 8A is a schematic sectional view of another example of the solid state battery according to the prior art. FIG. 8B is an enlarged schematic view of the negative electrode layer when an A4' portion is viewed in a P4' direction (that is, vertically downward direction) in FIG. 8A.

An object of the present invention is to provide a solid state battery capable of more sufficiently suppressing poor connection between an electrode layer (that is, positive electrode layer and/or negative electrode layer) and an end face electrode.

The present invention relates to a solid state battery having a laminated structure with one or more positive electrode layers and one or more negative electrode layers alternately stacked with a solid electrolyte layer interposed therebetween; a positive end surface electrode at a first end face of the laminated structure and electrically connected to the one or more positive electrode layers; and a negative end surface electrode at a second end face of the laminated structure and electrically connected to the one or more negative electrode layers, wherein (1) at least one positive electrode layer of the one or more positive electrode layers has a concavoconvex shape in a plan view thereof at an end on a side thereof that is electrically connected to the positive end surface electrode, and/or (2) at least one negative electrode layer of the one or more negative electrode layers has a concavoconvex shape in a plan view thereof at an end on a side thereof that is electrically connected to the negative end surface electrode.

Even if the solid state battery of the present invention has a current-collecting member-less structure, poor connection between the electrode layer (that is, positive electrode layer and/or negative electrode layer) and the end face electrode can be more sufficiently suppressed.

BRIEF EXPLANATION OF THE DRAWINGS

FIG. 5A is a schematic sectional view of an example of a solid state battery according to the prior art.

FIG. 5B is an enlarged schematic view of the negative electrode layer when an A1' portion is viewed in a P1' direction (that is, vertically downward direction) in FIG. 5A.

FIG. 6A is a schematic sectional view of another example of the solid state battery according to the prior art.

FIG. 6B is an enlarged schematic view of the negative electrode layer when an A2' portion is viewed in a P2' direction (that is, vertically downward direction) in FIG. 6A.

FIG. 7A is a schematic sectional view of another example of the solid state battery according to the prior art.

FIG. 7B is an enlarged schematic view of the negative electrode layer when an A3' portion is viewed in a P3' direction (that is, vertically downward direction) in FIG. 7A.

FIG. 8A is a schematic sectional view of another example of the solid state battery according to the prior art.

FIG. 8B is an enlarged schematic view of the negative electrode layer when an A4' portion is viewed in a P4' direction (that is, vertically downward direction) in FIG. 8A.

DETAILED DESCRIPTION OF THE INVENTION

[Solid State Battery]

Figure 1:
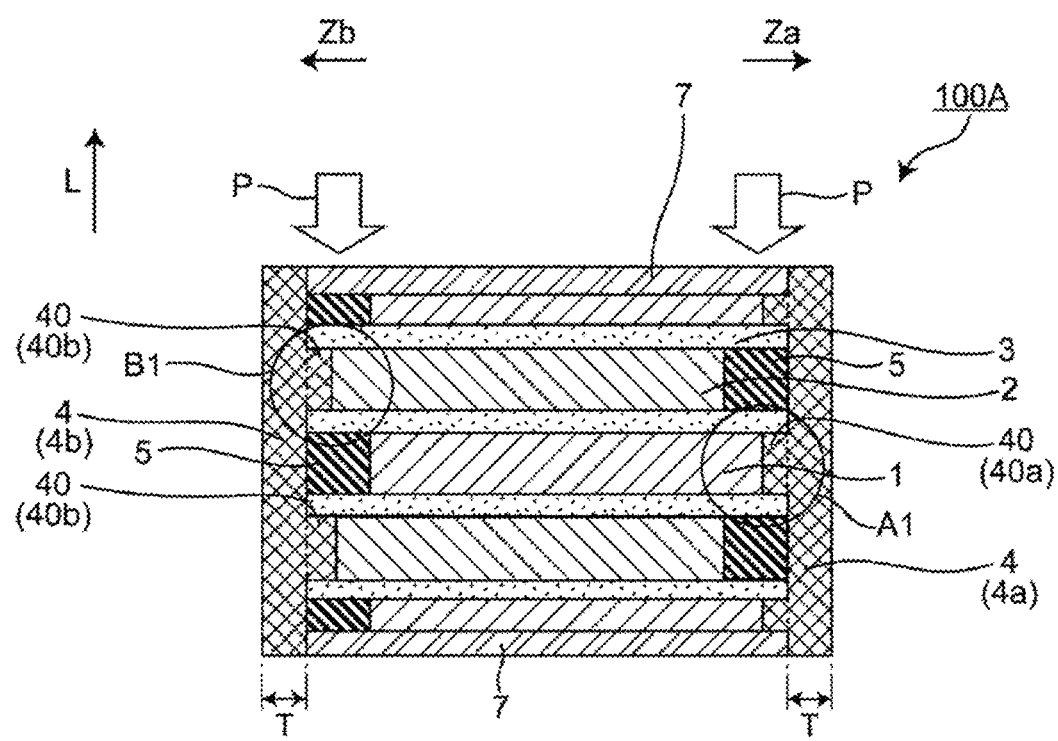
FIG. 1 is a schematic sectional view of a solid state battery according to a first embodiment of the present invention.

The present invention provides a solid state battery. The term "solid state battery" used here refers to, in a broad sense, a battery whose constituent elements (particularly the electrolyte layer) are composed of solid and refers to, in a narrow sense, "all solid state battery" whose constituent elements (particularly all constituent elements) are composed of solid. The "solid state battery" used here includes a so-called "secondary battery" capable of repeating charging and discharging, and a "primary battery" capable of only discharging. The "solid state battery" is preferably a "secondary battery". The "secondary battery" is not excessively limited by its name, and can include, for example, electrochemical devices such as "an electric storage device".

The term "plan view" used here refers to a state (top view or bottom view) where an object is viewed from above or below (particularly above) along a stacking direction L (or thickness direction of the solid state battery) of the aftermentioned layers constituting the solid state battery. The term "sectional view" used here refers to a sectional state (sectional view) viewed from a direction substantially perpendicular to the laminating direction L (or thickness direction of the solid state battery) of each layer constituting the solid state battery. In particular, a sectional view when explaining an end on an end face electrode side in a positive electrode layer and a negative electrode layer refers to a sectional state (sectional view) where the solid state battery is cut along a plane parallel to the stacking direction L and a plane passing through two end face electrodes (particularly a plane parallel to a straight line defining a distance between the two end face electrodes). The terms "vertical direction" and "horizontal direction" directly or indirectly used here correspond respectively to the vertical direction and the horizontal direction in the drawing. Unless otherwise stated, the same numerals and symbols denote the same members or portions or the same contents. In a preferred embodiment, it can be grasped that a vertical downward direction (that is, a direction in which gravity acts) corresponds to a "downward direction", and the opposite direction corresponds to an "upward direction".

Figure 3:
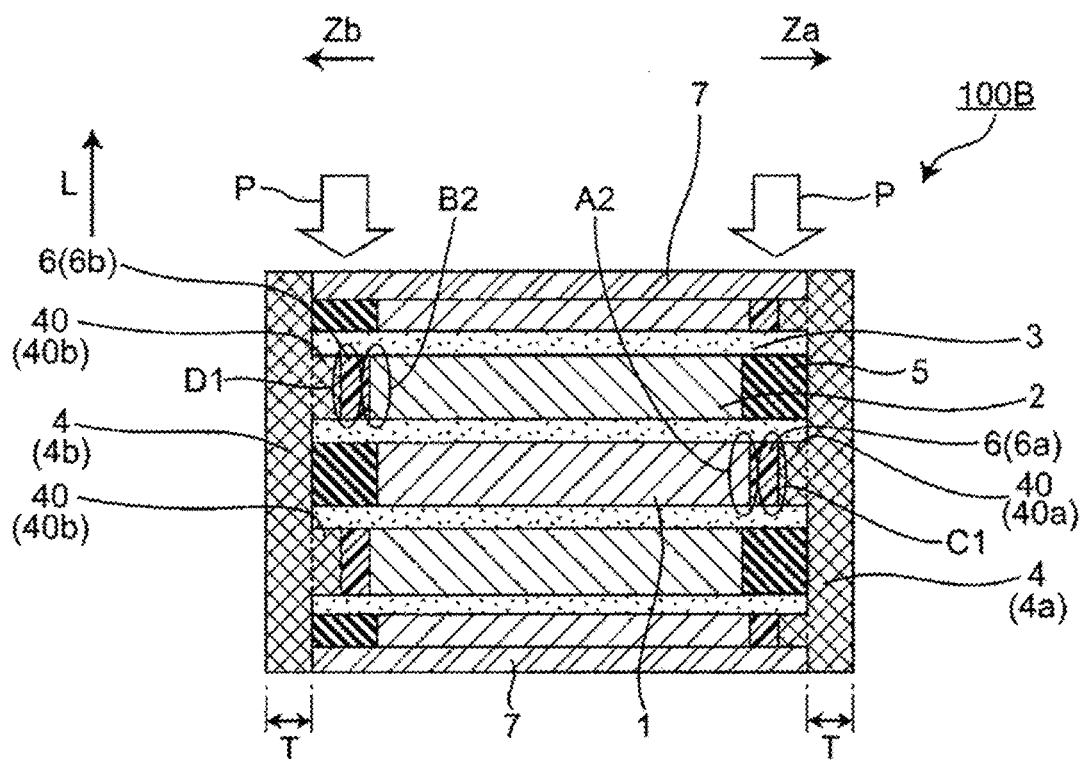
FIG. 3 is a schematic sectional view of a solid state battery according to a second embodiment of the present invention.

The solid state battery 100 of the present invention has, for example, a layered structure (particularly a laminated structure or laminated structure body) as shown by reference numerals "100A" and "100B" (hereinafter may be simply referred to as "100") in FIGS. 1 and 3, respectively. That is, in the solid state battery 100 of the present invention, one or more positive electrode layers 1 and one or more negative electrode layers 2 are alternately stacked with a solid electrolyte layer 3 interposed therebetween, and an end face electrode 4 (4a, 4b) is provided on an end face of the laminated structure. The end face of the laminated structure is a surface (so-called side surface) including the end face of each stacked layer and being parallel to the stacking direction. The end face electrodes 4a and 4b are usually formed on two opposite end faces in the laminated structure. The number of stacked layers of the positive electrode layer 1 and the negative electrode layer 2 is arbitrary and is not particularly limited. The solid state battery of the present invention may have a parallel structure or a series structure. FIGS. 1 and 3 are respective schematic sectional views of solid state batteries according to first and second embodiments of the present invention.

First, each layer (member) constituting the solid state battery of the present invention will be described.

(Electrode Layer)

An electrode layer includes a positive electrode layer 1 and a negative electrode layer 2. In the solid state battery of the present invention, the electrode layer is a layer having both a battery reaction function and a current collection function, that is, includes an active material and an electron conductive material.

The positive electrode layer 1 contains a so-called positive electrode active material and an electron conductive material, and may further contain a solid electrolyte material and/or a bondable material described later. The positive electrode layer 1 is usually composed of a sintered body containing positive electrode active material particles and the electron conductive material, and may be composed of the positive electrode active material particles, electron conductive material particles, and a sintered body containing solid electrolyte particles and/or a bondable material contained as desired.

The negative electrode layer 2 contains a so-called negative electrode active material and an electron conductive material, and may further contain the solid electrolyte material and/or the bondable material described later. The negative electrode layer 2 is usually composed of a sintered body containing negative electrode active material particles and the electron conductive material, and may be composed of the negative electrode active material particles, the electron conductive material particles, and the sintered body containing the solid electrolyte particles and/or the bondable material contained as desired.

The positive electrode active material contained in the positive electrode layer and the negative electrode active material contained in the negative electrode layer are substances involved in transfer of electrons in the solid state battery, and ions contained in the solid electrolyte material constituting the solid electrolyte layer move (conduct) between the positive electrode and the negative electrode to transfer electrons, so that charging and discharging are performed. The positive electrode layer and the negative electrode layer are particularly preferably layers capable of inserting and extracting lithium ions or sodium ions. That is, the solid state battery of the present invention is preferably a solid state secondary battery in which lithium ions or sodium ions move between the positive electrode and the negative electrode with the solid electrolyte layer interposed therebetween, thereby charging and discharging the battery.

The positive electrode active material contained in the positive electrode layer is not particularly limited, and examples thereof include at least one selected from the group consisting of a lithium-containing phosphate compound having a nasicon-type structure, a lithium-containing phosphate compound having an olivine-type structure, a lithium-containing layered oxide, and a lithium-containing oxide having a spinel-type structure. As an example of the lithium-containing phosphate compound having a nasicon-type structure, $Li_3V_2(PO_4)_3$ can be mentioned. As an example of the lithium-containing phosphate compound having an olivine-type structure, $LiFePO_4$, $LiMnPO_4$, and the like can be mentioned. As an example of the lithium-containing layered oxide, $LiCoO_2$, $LiCo_{1/3}Ni_{1/3}Mn_{1/3}O_2$, and the like can be mentioned. As an example of the lithium-containing oxide having a spinel-type structure, $LiMn_2O_4$, $LiNi_{0.5}Mn_{1.5}O_4$, and the like can be mentioned.

Examples of the positive electrode active material capable of inserting and extracting sodium ions include at least one selected from the group consisting of a sodium-containing phosphate compound having a nasicon-type structure, a sodium-containing phosphate compound having an olivine-type structure, a sodium-containing layered oxide, a sodium-containing oxide having a spinel-type structure and the like.

The negative electrode active material contained in the negative electrode layer is not particularly limited, and examples thereof include at least one selected from the group consisting of an oxide containing at least one element selected from the group consisting of Ti, Si, Sn, Cr, Fe, Nb, and Mo, a graphite-lithium compound, a lithium alloy, a lithium-containing phosphate compound having a nasicon-type structure, a lithium-containing phosphate compound having an olivine-type structure, and a lithium-containing oxide having a spinel-type structure. As an example of the lithium alloy, Li-Al alloys and the like can be mentioned. As an example of the lithium-containing phosphate compound having a nasicon-type structure, $Li_3V_2(PO_4)_3$ can be mentioned. As an example of the lithium-containing oxide having a spinel-type structure, $Li_4Ti_5O_{12}$ and the like can be mentioned.

Examples of the negative electrode active material capable of inserting and extracting sodium ions include at least one selected from the group consisting of a sodium-containing phosphate compound having a nasicon-type structure, a sodium-containing phosphate compound having an olivine-type structure, a sodium-containing oxide having a spinel-type structure and the like.

The electron conductive material contained in the positive electrode layer and the negative electrode layer is not particularly limited, and examples thereof include metal materials such as silver, palladium, gold, platinum, aluminum, copper, and nickel; and carbon materials. In particular, carbon is preferable because it is unlikely to react with the positive electrode active material, the negative electrode active material, and the solid electrolyte material, and is effective in reducing internal resistance of the solid state battery.

The solid electrolyte material that may be contained in the positive electrode layer and the negative electrode layer may be selected from, for example, a material similar to the solid electrolyte material that can be contained in the solid electrolyte layer described later.

The bondable material that may be contained in the positive electrode layer and the negative electrode layer may be selected from, for example, a material similar to the bondable material that can be contained in a bonding site described later.

The positive electrode layer and the negative electrode layer may each independently further contain a sintering aid. The sintering aid is not particularly limited, and may be, for example, at least one selected from the group consisting of lithium oxide, sodium oxide, potassium oxide, boron oxide, silicon oxide, bismuth oxide, and phosphorus oxide.

The thickness of the electrode layer (the positive electrode layer and the negative electrode layer) is not particularly limited, and is, for example, 2 μm to 50 μm, and from the viewpoint of further and sufficiently suppressing poor connection between the electrode layer and the end face electrode, the thickness is preferably 5 μm to 30 μm, and more preferably 5 μm to 20 μm.

The total number of stacked layers of the positive electrode layer 1 and the negative electrode layer 2 is not particularly limited, and may be, for example, 2 to 2000, and particularly 2 to 200.

(Current Collector Layer)

In the present invention, a portion of the electrode layer (that is, a portion of the positive electrode layer 1 and/or the negative electrode layer 2) may have a current collector layer 5. From the viewpoint of further improving energy density of the solid state battery, it is preferable that all the electrode layers do not have the current collector layer 5.

Although the current collector layer may have a form of a foil, the current collector layer preferably has a form of a sintered body from the viewpoint of reducing a manufacturing cost of the solid state battery by integral firing and reducing the internal resistance of the solid state battery.

When the current collector layer has the form of a sintered body, the current collector layer may be composed of, for example, a sintered body containing electron conductive material particles and a sintering aid. The electron conductive material contained in the current collector layer may be selected from, for example, a material similar to the electron conductive material that can be contained in the electrode layer. The sintering aid contained in the current collector layer may be selected from, for example, a material similar to the sintering aid that can be contained in the electrode layer.

The thickness of the current collector layer is not particularly limited, and may be, for example, 1 μm to 5 μm, particularly 1 μm to 3 μm.

(Solid Electrolyte Layer)

The solid electrolyte layer 3 is composed of a sintered body containing solid electrolyte particles. A material of the solid electrolyte particles (that is, solid electrolyte material) is not particularly limited as long as it can provide ions (for example, lithium ions or sodium ions) that can move (conduct) between the positive electrode layer and the negative electrode layer. Examples of the solid electrolyte material include a lithium-containing phosphate compound having a nasicon structure, an oxide having a perovskite structure, and an oxide having a garnet-type structure or a structure similar to the garnet-type structure. Examples of the lithium-containing phosphate acid compound having a nasicon structure include $Li_xM_y(PO_4)_3$ ($1 \leq x \leq 2$, $1 \leq y \leq 2$, M is at least one selected from the group consisting of Ti, Ge, Al, Ga and Zr). As an example of the lithium-containing phosphate compound having a nasicon structure, $Li_{1.2}Al_{0.2}Ti_{1.8}(PO_4)$; and the like can be mentioned, for example. As an example of the oxide having a perovskite structure, $La_{0.55}Li_{0.35}TiO_3$ and the like can be mentioned. As an example of the oxide having a garnet-type structure or a structure similar to the garnet-type structure, $Li_7La_3Zr_2O_{12}$ and the like can be mentioned.

Examples of the solid electrolyte material capable of conducting sodium ions include a sodium-containing phosphate compound having a nasicon structure, an oxide having a perovskite structure, and an oxide having a garnet-type structure or a structure similar to the garnet-type structure. Examples of the sodium-containing phosphate compound having a nasicon structure include $Na_xM_y(PO_4)_3$ ($1 \leq x \leq 2$, $1 \leq y \leq 2$, M is at least one selected from the group consisting of Ti, Ge, Al, Ga and Zr).

The solid electrolyte layer may contain a sintering aid. The sintering aid contained in the solid electrolyte layer may be selected from, for example, a material similar to the sintering aid that can be contained in the electrode layer.

The thickness of the solid electrolyte layer is not particularly limited, and may be, for example, 1 μm to 15 μm, particularly 1 μm to 5 μm.

(End Face Electrode)

The end face electrode 4 is an electrode formed on the end face of the laminated structure, and usually refers to the respective end face electrodes (4a, 4b) of the positive electrode and the negative electrode formed on two opposite end faces in a laminated structure body. The end face electrodes 4a and 4b may be each formed on the entire or a part of the end face of the laminated structure. The end face electrodes 4a and 4b are preferably formed on the entire end face of the laminated structure from the viewpoint of further and sufficiently suppressing poor connection between the electrode layer and the end face electrode. The end face of the laminated structure is a surface (so-called side surface) including the end face of each stacked layer and being parallel to the stacking direction.

The end face electrode 4 is usually composed of a sintered body containing electron conductive material particles and a sintering aid. The electron conductive material contained in the end face electrode 4 may be selected from, for example, a material similar to the electron conductive material that can be contained in the electrode layer. The sintering aid contained in the end face electrode 4 may be selected from, for example, a material similar to the sintering aid that can be contained in the electrode layer.

The thickness of the end face electrode is not particularly limited, and may be, for example, 1 μm to 20 μm, particularly 1 μm to 10 μm. The thickness of the end face electrode is a length dimension in a Za direction or a Zb direction in the end face electrode 4, and is specifically a length indicated by the symbol "T" in FIGS. 1 and 3.

(Insulating Layer)

The insulating layer 5 is usually disposed between the positive electrode layer 1 and an end face electrode 40b of the negative electrode and between the negative electrode layer 2 and an end face electrode 40a of the positive electrode. The insulating layer is not particularly limited as long as it has an electrically insulating property, and may be composed of, for example, a solid electrolyte material or air.

When the insulating layer 5 contains the solid electrolyte material, the insulating layer is preferably composed of a sintered body containing the solid electrolyte material, and may further contain a sintering aid.

The solid electrolyte material that may be contained in the insulating layer 5 may be selected from, for example, a material similar to the solid electrolyte material that can be contained in the solid electrolyte layer. The sintering aid that may be contained in the insulating layer may be selected from, for example, a material similar to the sintering aid that can be contained in the electrode layer.

(Bonding Site)

The solid state battery 100 of the present invention may include a bonding site 6 as described later. The bonding site is a portion responsible for bonding the electrode layer and the end face electrode having the same polarity as that of the electrode layer.

The bonding site 6 is usually composed of a sintered body containing a bondable material. The bondable material (for example, particles) is, for example, inorganic particles that can easily achieve bonding at a particle interface between a constituent material (for example, particles) of the electrode layer and a constituent material (for example, particles) of the end face electrode when the bondable material comes into contact with these constituent materials and is sintered. The bondable material may or may not have electron conductivity and/or ionic conductivity, but preferably has electron conductivity. Examples of the bondable material include quartz glass ($SiO_2$), a composite oxide-based glass in which $SiO_2$ is combined with at least one selected from PbO, $B_2O_3$, MgO, ZnO, $Bi_2O_3$, $Na_2O$, $Al_2O_3$, CaO, and BaO, indium tin oxide (ITO), ZnO, CoO, NiO, MnO, CuO, $BaTiO_3$, $SrTiO_3$, and $LaCoO_3$.

In addition to the bondable material, the bonding site 6 may further contain an electron conductive material, a solid electrolyte material, and/or a sintering aid. The electron conductive material contained in the bonding site 6 may be selected from, for example, a material similar to the electron conductive material that can be contained in the electrode layer. The solid electrolyte material contained in the bonding site 6 may be selected from, for example, a material similar to the solid electrolyte material that can be contained in the solid electrolyte layer. The sintering aid contained in the bonding site 6 may be selected from, for example, a material similar to the sintering aid that can be contained in the electrode layer.

The thickness of the bonding site 6 (that is, the thickness in the stacking direction L) is not particularly limited, and may be usually the thickness similar to the thickness of the electrode layer to be bonded with the end face electrode.

(Protective Layer)

A protective layer 7 is usually disposed on an outermost surface of the electrode layer. The outermost surface of the electrode layer is an uppermost surface of the electrode layer disposed at the top (positive electrode layer 1 in FIGS. 1 and 3) and a lowermost surface of the electrode layer disposed at the bottom (positive electrode layer 1 in FIGS. 1 and 3).

The protective layer 7 is not particularly limited as long as it has electrical insulation properties and protects the solid state battery from an external impact, and may be composed of, for example, a solid electrolyte material or may be composed of various resin materials, ceramic, glass material, metal-resin laminated material and the like.

When the protective layer 7 contains the solid electrolyte material, the protective layer is preferably composed of a sintered body containing the solid electrolyte material, and may further contain a sintering aid.

The solid electrolyte material that may be contained in the protective layer 7 may be selected from, for example, a material similar to the solid electrolyte material that can be contained in the solid electrolyte layer. The sintering aid that may be contained in the protective layer may be selected from, for example, a material similar to the sintering aid that can be contained in the electrode layer.

The thickness of the protective layer 7 is not particularly limited, and may be, for example, 1 μm to 1000 μm, particularly 10 μm to 200 μm.

Additional Structure of Solid State Battery of the Present Invention

The solid state battery of the present invention has a current-collecting member-less structure. The current-collecting member-less structure is a structure in which at least one electrode layer of the positive electrode layer and the negative electrode layer does not have a current collecting member such as a current collector layer and a current collector (for example, a foil). The "current collecting member such as a current collector layer and a current collector (for example, a foil)" is a member that exclusively exerts a current collection function without directly contributing to a battery reaction (for example, electron generating reaction) and therefore is different from the electrode layer having both the function as an electrode and the function as a current collector.

The electrode layer having the current-collecting member-less structure has both the function as an electrode and the function as a current collector. The fact that the electrode layer has both the function as an electrode and the function as a current collector means that the electrode layer not only performs a battery reaction (charge/discharge reaction), but also can move or induce electrons, generated by the reaction, to the end face electrode. The electrode layer having these functions, such as the positive electrode layer and the negative electrode layer, usually contains an active material and an electron conductive material, does not require a current collector such as a foil or other members such as a current collector layer, and can move electrons to the end face electrode.

In the solid state battery of the present invention, as shown in FIGS. 1 and 3, both the electrode layers including the positive electrode layer 1 and the negative electrode layer 2 may have the current-collecting member-less structure, or one of the electrode layers may have the current-collecting member-less structure. In the solid state battery of the present invention, both the electrode layers including the positive electrode layer 1 and the negative electrode layer 2 preferably have the current-collecting member-less structure from the viewpoint of further improving the energy density of the solid state battery. In the solid state battery of the present invention, from the viewpoint of further and sufficiently suppressing poor connection between the electrode layer and the end face electrode and further improving the energy density of the solid state battery, both the electrode layers including the positive electrode layer 1 and the negative electrode layer 2 preferably have the current-collecting member-less structure and have an end concavoconvex shape described later.

In the solid state battery of the present invention, at least one electrode layer of the positive electrode layer 1 and the negative electrode layer 2 (particularly the electrode layer having the current-collecting member-less structure) has the end concavoconvex shape as shown in FIGS. 1, 2A to 2L, 3 and 4A to 4I. The end concavoconvex shape is a structure in which as shown in FIGS. 1, 2A to 2L, 3 and 4A to 4I, the electrode layer (particularly the electrode layer having the current-collecting member-less structure) is electrically connected to the end face electrodes 4a and 4b having the same polarity as that of the electrode layer while having a concavoconvex shape in a plan view at an end (A1 to A2 and B1 to B2) on the side of the end face electrode 4 (4a, 4b) having the same polarity as that of the electrode layer. For example, as shown in these figures, the positive electrode layer 1 (particularly the positive electrode layer 1 having the current-collecting member-less structure) is electrically connected to the end face electrode 4a of the positive electrode while having a concavoconvex shape in a plan view at the end (A1 to A2) on the end face electrode 4a side of the positive electrode. For example, as shown in these figures, the negative electrode layer 2 (particularly the negative electrode layer 2 having the current-collecting member-less structure) is electrically connected to the end face electrode 4b of the negative electrode while having a concavoconvex shape in a plan view at the end (B1 to B2) on the end face electrode 4b side of the negative electrode. FIGS. 2A to 2L are enlarged schematic plan views near the end on the end face electrode side of the negative electrode layer (or positive electrode layer) for explaining an example of the concavoconvex shape that the negative electrode layer (or positive electrode layer) may have at the end on the end face electrode side in the solid state battery of the present invention shown in FIG. 1. In FIGS. 2A to 2L, a structural example is shown when the negative electrode layer 2 is bonded to the left end face electrode 4b (particularly the take-out portion 40b of the end face electrode 4b) on the negative electrode side, and a structural example is also shown when the positive electrode layer 1 is bonded to the left end face electrode 4a (particularly the take-out portion 40a of the end face electrode 4a) on the positive electrode side. For example, when the negative electrode layer 2 is shown in FIGS. 2A to 2L, FIGS. 2A to 2L are enlarged plan views of a bonding portion between the negative electrode layer and the take-out portion 40b when a B1 portion is viewed in the P direction (that is, vertically downward direction) in FIG. 1. For example, when the positive electrode layer 1 is shown in FIGS. 2A to 2L, FIGS. 2A to 2L are enlarged plan views of a bonding portion between the positive electrode layer and the take-out portion 40a when an A1 portion is viewed in the P direction (that is, vertically downward direction) in FIG. 1. FIGS. 4A to 4I are enlarged schematic plan views near the end on the end face electrode side of the negative electrode layer (or positive electrode layer) for explaining an example of the concavoconvex shape that the negative electrode layer (or positive electrode layer) may have at the end on the end face electrode side in the solid state battery of the present invention shown in FIG. 3. In FIGS. 4A to 4I, a structural example is shown when the negative electrode layer 2 is bonded to the left end face electrode 4b (particularly the take-out portion 40b of the end face electrode 4b) on the negative electrode side with the bonding site 6b interposed therebetween, and a structural example is also shown when the positive electrode layer 1 is bonded to the left end face electrode 4a (particularly the take-out portion 40a of the end face electrode 4a) on the positive electrode side via the bonding site 6a. For example, when the negative electrode layer 2 is shown in FIGS. 4A to 4I, FIGS. 4A to 4I are enlarged plan views of a bonding portion between the negative electrode layer 2 and the take-out portion 40b via the bonding site 6b when a B2 portion is viewed in the P direction (that is, vertically downward direction) in FIG. 3. For example, when the positive electrode layer 1 is shown in FIGS. 4A to 4I, FIGS. 4A to 4I are enlarged plan views of a bonding portion between the positive electrode layer 1 and the take-out portion 40a via the bonding site 6a when an A2 portion is viewed in the P direction (that is, vertically downward direction) in FIG. 3.

Specifically, as shown in FIGS. 1 and 3, the electrode layers 1 and 2 have a concavoconvex shape in a plan view at the end (A1 to A2 and B1 to B2) on the side of the end face electrode 4 (4a, 4b) having the same polarity as that of the electrode layer, and convex portions 10 and 20 in the concavoconvex shape protrude toward the end face electrode 4 (4a, 4b) (that is, Za direction and Zb direction) having the same polarity as that of the electrode layer in a plan view, as shown in FIGS. 2A to 2L and FIGS. 4A to 4I. For example, the positive electrode layer 1 has a concavoconvex shape at the end (A1 to A2) on the end face electrode 4a side of the positive electrode, and the convex portion 10 in the concavoconvex shape protrudes on the end face electrode 4a side (that is, in the Za direction) of the positive electrode in a plan view. For example, the negative electrode layer 2 has a concavoconvex shape at the end (B1 to B2) on the end face electrode 4b side of the negative electrode, and the convex portion 20 in the concavoconvex shape protrudes on the end face electrode 4b side (that is, in the Zb direction) of the negative electrode in a plan view.

The fact that the end (A1 to A2 and B1 to B2) on the end face electrode 4 (4a, 4b) side in the electrode layers 1 and 2 has a concavoconvex shape in a plan view means that an end face of the end in the electrode layer is not indicated by a straight line in a plan view. Specifically, in each of the electrode layers 1 and 2, as shown in FIGS. 2A to 2L and 4A to 4I, the end (A1 to A2 and B1 to B2) on the side of the end face electrode 4 (4a, 4b) having the same polarity as that of the electrode layer protrudes toward the end face electrode 4 (4a, 4b) having the same polarity as that of the electrode layer (that is, in the Za and Zb directions) with reference to a vertical line X passing through a point most distal from the end face electrode 4 among points on a line segment defining the end face of the end in a plan view. For example, in the positive electrode layer 1, as shown in FIGS. 2A to 2L and FIGS. 4A to 4I, an end 10 on the end face electrode 4a side of the positive electrode protrudes toward the end face electrode 4a (in the Za direction) of the positive electrode with reference to a straight line X passing through a point most distal from the end face electrode 4a among the points on the line segment defining the end face of the end in a plan view. For example, in the negative electrode layer 2, as shown in FIGS. 2A to 2L and FIGS. 4A to 4I, an end 20 on the end face electrode 4b side of the negative electrode protrudes toward the end face electrode 4b (Zb direction) of the negative electrode with reference to the straight line X passing through a point most distal from the end face electrode 4b among the points on the line segment defining the end face of the end in a plan view. The straight line X is usually a straight line that defines a plane perpendicular to a horizontal plane.

The ends (A1 to A2 and B1 to B2) on the end face electrode 4 (4a, 4b) side in each of the electrode layers 1 and 2 may be directly or indirectly connected to the end face electrode 4 (4a, 4b) having the same polarity as that of the electrode layer. The fact that the end is directly connected to the end face electrode means that the end is directly and electrically connected to the end face electrode 4, as shown in the ends A1 and B1 of FIG. 1. The fact that the end is indirectly connected to the end face electrode means that the end is indirectly and electrically connected to the end face electrode 4 with the bonding site 6 interposed therebetween, as shown in the ends A2 and B2 of FIG. 3.

The solid state battery of the present invention has an end concavoconvex shape at the end on the end face electrode side in the electrode layer such as the positive electrode layer 1 and/or the negative electrode layer 2, so that the electrode layer can be "complicatedly" bonded to the end face electrode or the bonding site. As a result, a bonding area between the electrode layer and the end face electrode or the bonding site can be increased as compared with a case where the end concavoconvex shape is not formed, and deterioration of battery characteristics due to bonding failure can be suppressed more sufficiently.

A protruding length L of the convex portions 10 and 20 in the end concavoconvex shape of the electrode layer is usually 1 µm to 500 µm, and preferably 10 µm to 200 µm from the viewpoint of further and sufficiently suppressing poor connection between the electrode layer and the end face electrode. As shown in FIGS. 2A to 2L and 4A to 4I, the protruding length L of the convex portions 10 and 20 is a horizontal length (that is, distance) from a point most distal from the end face electrode to a point most proximal therefrom among the points on the line segment defining the end face of the end in a plan view.

The end concavoconvex shape that the electrode layer may have is not particularly limited as long as it has convex portions and concave portions.

The concave and convex portions constituting the concavoconvex shape may each independently have in part or wholly an R shape (radiused shape) and/or a square shape.

The concave and convex portions constituting the concavoconvex shape each independently may or may not have the same dimension.

The number of the concave and convex portions constituting the concavoconvex shape is not particularly limited, and may be, for example, a number such that the convex portions are present continuously (or in an overlapping manner) or a number such that the convex portions are present intermittently.

The concavoconvex shape that the electrode layer may have may be a regular concavoconvex shape in which a plurality of concave portions and a plurality of convex portions are regularly arranged, or an irregular concavoconvex shape in which a plurality of concave portions and a plurality of convex portions are irregularly arranged.

Examples of the regular concavoconvex shape that the electrode layers 1 and 2 may have include a regular square concave-round convex shape, a regular square concave-square convex shape, a regular round concave-square convex shape, and a regular round concave-round convex shape, depending on a combination of the shape of the concave portion and the shape of the convex portion.

The regular square concave-round convex shape is, for example, a regular concavoconvex shape in which like the concavoconvex shape shown in FIGS. 2A, 2J, 4B, 4C, 4D, 4H, and 4I, a plurality of concave portions having a square shape and a plurality of convex portions having a round shape are regularly arranged.

The regular square concave-square convex shape is, for example, a regular concavoconvex shape in which like the concavoconvex shape shown in FIGS. 2B, 2C, 2E, and 2F, a plurality of concave portions having a square shape and a plurality of convex portions having a square shape are regularly arranged.

The regular round concave-square convex shape is, for example, a regular concavoconvex shape in which like the concavoconvex shape shown in FIGS. 2D, 2G, 2L, 4A, 4E, 4F, and 4G, a plurality of concave portions having a round shape and a plurality of convex portions having a square shape are regularly arranged.

Figure 2A:
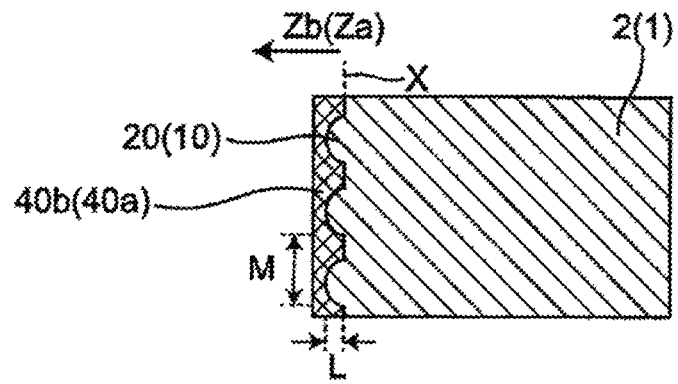
FIG. 2A is an enlarged schematic plan view near an end on an end face electrode side of a negative electrode layer (or positive electrode layer) for explaining an example of a concavoconvex shape that the negative electrode layer (or positive electrode layer) may have at the end on the end face electrode side in the solid state battery of the present invention shown in FIG. 1.
Figure 2B:
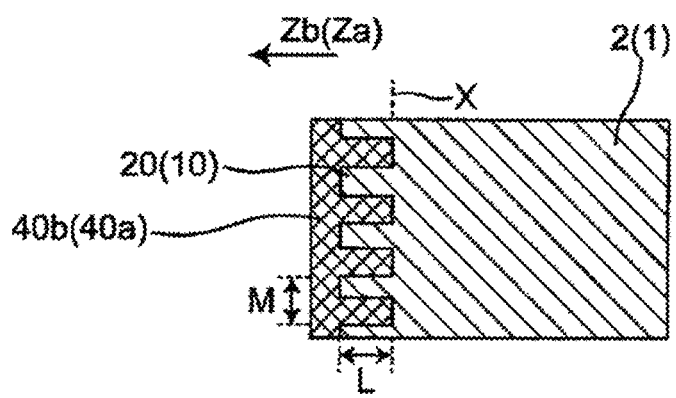
FIG. 2B is an enlarged schematic plan view near the end on the end face electrode side of the negative electrode layer (or positive electrode layer) for explaining an example of the concavoconvex shape that the negative electrode layer (or positive electrode layer) may have at the end on the end face electrode side in the solid state battery of the present invention shown in FIG. 1.
Figure 2C:
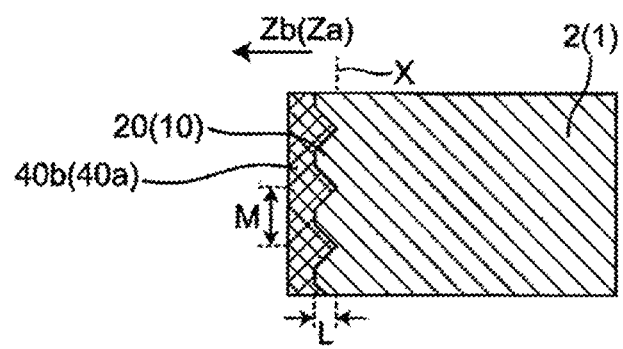
FIG. 2C is an enlarged schematic plan view near the end on the end face electrode side of the negative electrode layer (or positive electrode layer) for explaining an example of the concavoconvex shape that the negative electrode layer (or positive electrode layer) may have at the end on the end face electrode side in the solid state battery of the present invention shown in FIG. 1.
Figure 2D:
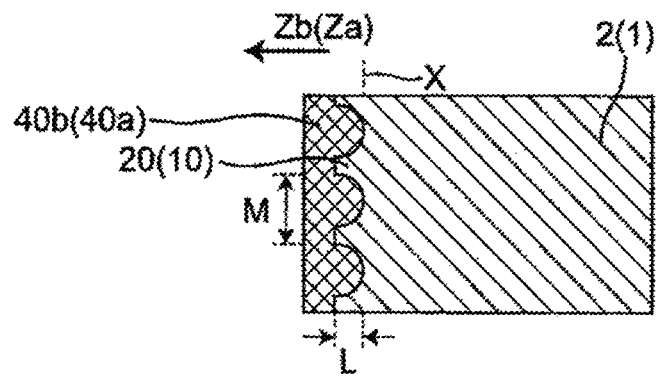
FIG. 2D is an enlarged schematic plan view near the end on the end face electrode side of the negative electrode layer (or positive electrode layer) for explaining an example of the concavoconvex shape that the negative electrode layer (or positive electrode layer) may have at the end on the end face electrode side in the solid state battery of the present invention shown in FIG. 1.
Figure 2E:
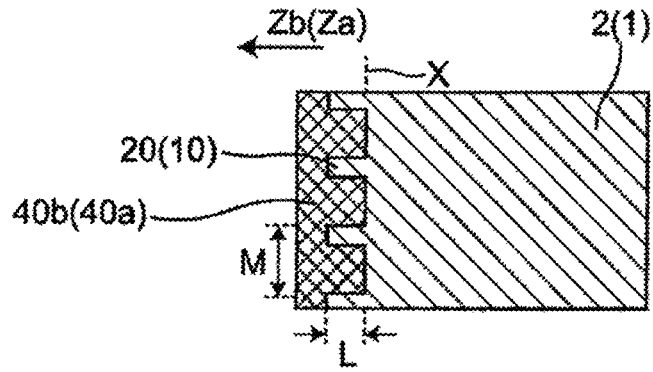
FIG. 2E is an enlarged schematic plan view near the end on the end face electrode side of the negative electrode layer (or positive electrode layer) for explaining an example of the concavoconvex shape that the negative electrode layer (or positive electrode layer) may have at the end on the end face electrode side in the solid state battery of the present invention shown in FIG. 1.
Figure 2F:
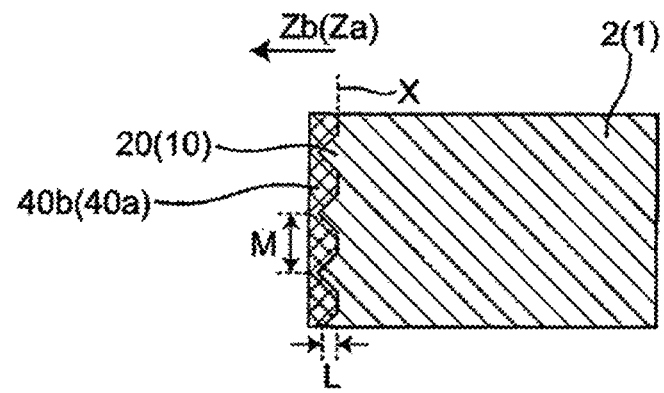
FIG. 2F is an enlarged schematic plan view near the end on the end face electrode side of the negative electrode layer (or positive electrode layer) for explaining an example of the concavoconvex shape that the negative electrode layer (or positive electrode layer) may have at the end on the end face electrode side in the solid state battery of the present invention shown in FIG. 1.
Figure 2G:
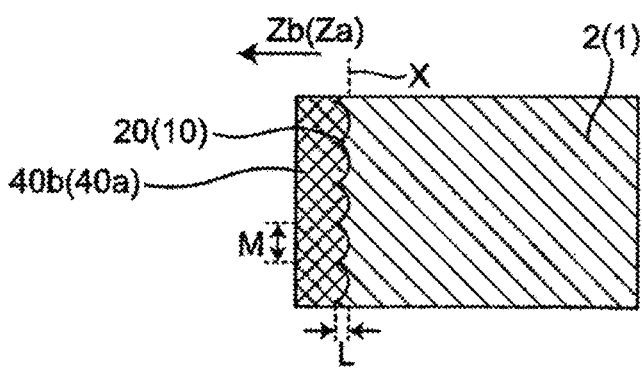
FIG. 2G is an enlarged schematic plan view near the end on the end face electrode side of the negative electrode layer (or positive electrode layer) for explaining an example of the concavoconvex shape that the negative electrode layer (or positive electrode layer) may have at the end on the end face electrode side in the solid state battery of the present invention shown in FIG. 1.
Figure 2H:
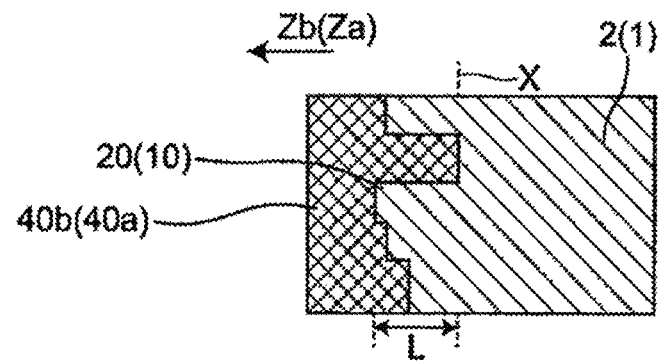
FIG. 2H is an enlarged schematic plan view near the end on the end face electrode side of the negative electrode layer (or positive electrode layer) for explaining an example of the concavoconvex shape that the negative electrode layer (or positive electrode layer) may have at the end on the end face electrode side in the solid state battery of the present invention shown in FIG. 1.
Figure 2I:
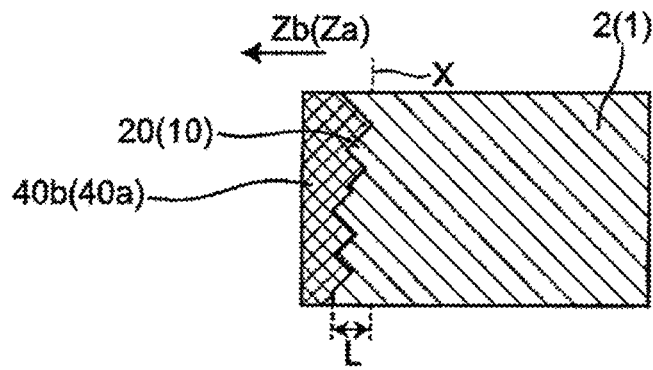
FIG. 2I is an enlarged schematic plan view near the end on the end face electrode side of the negative electrode layer (or positive electrode layer) for explaining an example of the concavoconvex shape that the negative electrode layer (or positive electrode layer) may have at the end on the end face electrode side in the solid state battery of the present invention shown in FIG. 1.
Figure 2J:
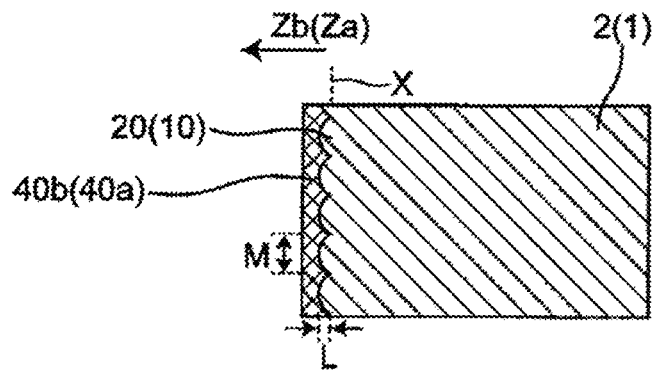
FIG. 2J is an enlarged schematic plan view near the end on the end face electrode side of the negative electrode layer (or positive electrode layer) for explaining an example of the concavoconvex shape that the negative electrode layer (or positive electrode layer) may have at the end on the end face electrode side in the solid state battery of the present invention shown in FIG. 1.
Figure 2K:
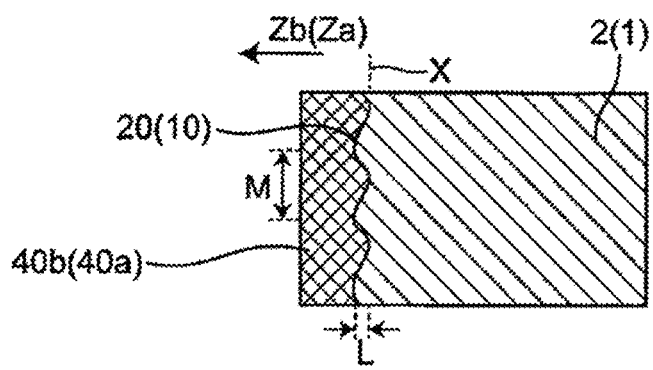
FIG. 2K is an enlarged schematic plan view near the end on the end face electrode side of the negative electrode layer (or positive electrode layer) for explaining an example of the concavoconvex shape that the negative electrode layer (or positive electrode layer) may have at the end on the end face electrode side in the solid state battery of the present invention shown in FIG. 1.
Figure 2L:
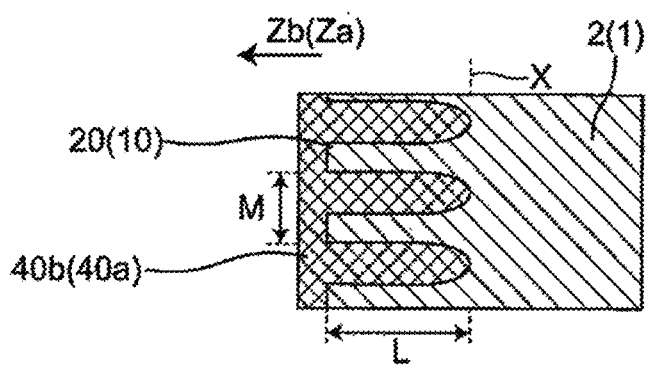
FIG. 2L is an enlarged schematic plan view near the end on the end face electrode side of the negative electrode layer (or positive electrode layer) for explaining an example of the concavoconvex shape that the negative electrode layer (or positive electrode layer) may have at the end on the end face electrode side in the solid state battery of the present invention shown in FIG. 1.

The regular round concave-round convex shape is, for example, a regular concavoconvex shape in which like the concavoconvex shape shown in FIG. 2K, a plurality of concave portions having a round shape and a plurality of convex portions having a round shape are regularly arranged.

Examples of the irregular concavoconvex shape that the electrode layers 1 and 2 may have include an irregular square concave-round convex shape, an irregular square concave-square convex shape, an irregular round concave-square convex shape, and an irregular round concave-round convex shape, depending on the combination of the shape of the concave portion and the shape of the convex portion.

The irregular square concave-round convex shape is, for example, an irregular concavoconvex shape in which a plurality of concave portions having a square shape and a plurality of convex portions having a round shape are irregularly arranged.

The irregular square concave-square convex shape is, for example, an irregular concavoconvex shape in which like the concavoconvex shape shown in FIGS. 2H and 2I, a plurality of concave portions having a square shape and a plurality of convex portions having a square shape are irregularly arranged.

The irregular round concave-square convex shape is, for example, an irregular concavoconvex shape in which a plurality of concave portions having a round shape and a plurality of convex portions having a square shape are irregularly arranged.

The irregular round concave-round convex shape is, for example, an irregular concavoconvex shape in which a plurality of concave portions having a round shape and a plurality of convex portions having a round shape are irregularly arranged.

The concavoconvex shape that the electrode layer may have is preferably a regular concavoconvex shape from the viewpoint of uniformity of bonding strength between the end face electrode and the electrode layer.

The concavoconvex shape that the electrode layer may have is preferably a regular square concave-round convex shape, a regular square concave-square convex shape, or a regular round concave-square convex shape, particularly preferably the regular square concave-square convex shape, from the viewpoint of further and sufficiently suppressing poor connection between the electrode layer and the end face electrode, based on a further increase of the bonding area between the electrode layer and the end face electrode or the bonding site.

When the concavoconvex shape that the electrode layer may have is a regular concavoconvex shape, a pitch (that is, a period) M (see FIGS. 2A to 2G, 2J to 2L, and 4A to 4I) in the regular concavoconvex shape is usually 10 μm or more, particularly 10 μm to 1000 μm, and from the viewpoint of further and sufficiently suppressing poor connection between the electrode layer and the end face electrode, the pitch M is preferably 10 μm to 500 μm and more preferably 10 μm to 200 μm.

In the solid state battery of the present invention, both the electrode layers including the positive electrode layer 1 and the negative electrode layer 2 (particularly both the electrode layers having the current-collecting member-less structure) may have the end concavoconvex shape, or one of the electrode layers (particularly one of the electrode layers having the current-collecting member-less structure) may have the end concavoconvex shape. In the solid state battery of the present invention, from the viewpoint of further and sufficiently suppressing poor connection between the electrode layer and the end face electrode and further improving the energy density of the solid state battery, both the electrode layers including the positive electrode layer 1 and the negative electrode layer 2 preferably have the end concavoconvex shape and more preferably have the end concavoconvex shape and the current-collecting member-less structure.

When the positive electrode layer 1 has the end concavoconvex shape, not all the positive electrode layers 1 must have the end concavoconvex shape, and some of the positive electrode layers 1 (particularly the outermost positive electrode layer 1) do not have to have the end concavoconvex shape. The outermost positive electrode layer 1 is the uppermost positive electrode layer and/or the lowermost positive electrode layer. In the solid state battery of the present invention, from the viewpoint of further and sufficiently suppressing poor connection between the electrode layer and the end face electrode and further improving the energy density of the solid state battery, all the positive electrode layers 1 preferably have the end concavoconvex shape and more preferably have the end concavoconvex shape and the current-collecting member-less structure.

When the negative electrode layer 2 has the end concavoconvex shape, as in the positive electrode layer 1, not all the negative electrode layers 2 must have the end concavoconvex shape, and some of the negative electrode layers 2 do not have to have the end concavoconvex shape. In the solid state battery of the present invention, from the viewpoint of further and sufficiently suppressing poor connection between the electrode layer and the end face electrode and further improving the energy density of the solid state battery, all the negative electrode layers 2 preferably have the end concavoconvex shape and more preferably have the end concavoconvex shape and the current-collecting member-less structure.

When the ends on the end face electrode side of the electrode layers 1 and 2 are directly and electrically connected to the end face electrode 4 (4a, 4b), as shown in FIGS. 1 and 2A to 2L, for example, the end face electrode 4 (4a, 4b) has, in a plan view, the take-out portion 40 (40a, 40b) having a shape complementary to the end (particularly the end concavoconvex shape) on the end face electrode side of the electrode layer. The take-out portion 40 (40a, 40b) is a member having a complementary shape corresponding to the end concavoconvex shape (particularly the convex portion and the concave portion) of the electrode layer while forming a portion of the end face electrode 4 (4a, 4b) and is usually formed from a material similar to the end face electrode 4. As shown in FIGS. 1 and 2A to 2L (particularly FIG. 1), the take-out portion 40 (40a, 40b) of the end face electrode 4 (4a, 4b) protrudes toward the electrode layers 1 and 2 having the same polarity as that of the end face electrode 4. That is, the take-out portion 40a of the end face electrode 4a on the positive electrode side protrudes toward the positive electrode layer 1, and the take-out portion 40b of the end face electrode 4b on the negative electrode side protrudes toward the negative electrode layer 2. In this case, the complementary shape of the take-out portions 40a and 40b is a shape that can be abutted against or mate the end (particularly the end concavoconvex shape at the end) on the end face electrode side of the electrode layers 1 and 2 with a clearance that is as close to 0 mm as possible (particularly 0 mm), for example. With the take-out portion 40 (40a, 40b) thus configured, connection and mating between the electrode layers 1 and 2 (particularly the end on the end face electrode side thereof) and the end face electrode 4 (4a, 4b) (particularly the take-out portion 40 (40a, 40b)) are achieved. From the viewpoint of further and sufficiently suppressing poor connection between the electrode layer and the end face electrode, it is preferable that the electrode layers 1 and 2 (particularly the end on the end face electrode side thereof) are integrally sintered with the end face electrode 4 (4a, 4b) (particularly the take-out portion 40 (40a, 40b)) as integral sintering between sintered bodies. The expression "integral sintering between sintered bodies" means that two or more members adjacent to each other or in contact with each other are bonded by sintering. In this case, from the viewpoint of further and sufficiently suppressing poor connection between the electrode layer and the end face electrode, it is preferable that the electrode layers 1 and 2 (particularly the end on the end face electrode side thereof) and the end face electrode 4 (4a, 4b) (particularly the take-out portion 40 (40a, 40b)) are integrally sintered while being both sintered bodies.

When the ends on the end face electrode side of the electrode layers 1 and 2 are directly and electrically connected to the end face electrode 4 (4a, 4b), as shown in FIGS. 1 and 2A to 2L, the ends on the end face electrode side of the electrode layers 1 and 2 are usually directly and electrically connected to the end face electrode 4 (4a, 4b) (particularly the take-out portion 40 (40a, 40b)) on the entire end face.

The ends on the end face electrode side of the electrode layers 1 and 2 may be indirectly and electrically connected to the end face electrode 4 (4a, 4b) with the bonding site 6 (6a, 6b) interposed therebetween. As a result, the bonding strength of the electrode layer with the end face electrode (particularly the bonding strength of the electrode layer with the end face electrode via the bonding site) further increases, and deterioration of battery performance due to bonding failure between the electrode layer and the end face electrode can be further and sufficiently suppressed.

When the ends on the end face electrode side of the electrode layers 1 and 2 are indirectly and electrically connected to the end face electrode 4 (4a, 4b) with the bonding site 6 (6a, 6b) interposed therebetween, as shown in FIGS. 3 and 4A to 4I, for example (particularly FIGS. 4A to 4C, 4E to 4F, and 4H to 4I), on the electrode layers 1 and 2 side, the bonding site 6 (6a, 6b) has, in a plan view, a shape complementary to the ends (particularly the end concavoconvex shape) of the electrode layers 1 and 2. For example, as shown in FIGS. 3 and 4A to 4I, for example, on the positive electrode layer 1 side, the bonding site 6a of the positive electrode layer 1 has, in a plan view, a shape complementary to the end (particularly the end concavoconvex shape) of the positive electrode layer 1. For example, as shown in FIGS. 3 and 4A to 4I, for example, on the negative electrode layer 2 side, the bonding site 6b of the negative electrode layer 2 has, in a plan view, a shape complementary to the end (particularly the end concavoconvex shape) of the negative electrode layer 2. The complementary shape of the bonding site 6 (6a, 6b) on the side of the electrode layers 1 and 2 is a shape that can be abutted against or mate the end (particularly the convex portion and the concave portion) on the end face electrode side of the electrode layers 1 and 2 with a clearance that is as close to 0 mm as possible (particularly 0 mm), for example. With such a complementary shape, connection and mating between the electrode layers 1 and 2 (particularly the end on the end face electrode side thereof) and the bonding site (6a, 6b) are achieved. It is preferable that the electrode layers 1 and 2 (particularly the end on the end face electrode side thereof) are integrally sintered with the bonding site 6 (6a, 6b) as integral sintering between sintered bodies. The expression "integral sintering between sintered bodies" means that two or more members adjacent to each other or in contact with each other are bonded by sintering. In this case, it is preferable that while the electrode layers 1 and 2 (particularly the end on the end face electrode side thereof) and the bonding site 6 (6a, 6b) are integrally sintered while being all sintered bodies. The bonding site 6 is usually composed of a material different from the constituent materials of the electrode layer (the positive electrode layer 1 and/or the negative electrode layer 2) and the end face electrode 4. For example, the bonding site 6 is composed of a material whose type and/or blending ratio are/is different from that of the constituent material of the positive electrode layer 1, the constituent material of the negative electrode layer 2, and the constituent material of the end face electrode 4 (and the constituent material of the solid electrolyte layer 3).

From the viewpoint of further and sufficiently suppressing poor connection between the electrode layer and the end face electrode, as shown in FIGS. 4A, 4C, 4F and 4I, the bonding site 6 (6a, 6b) preferably has the end concavoconvex shape at the end on the end face electrode side (that is, in the bonding site, the end opposite to a portion having a shape complementary to the end concavoconvex shape of the electrode layer in a plan view). The end concavoconvex shape of the bonding site is substantially the same as the end concavoconvex shape of the electrode layer, and is namely a structure in which, as shown in FIGS. 4A to 4I, while the bonding site 6 has a concavoconvex shape in a plan view at the end (C1 and D1) on the end face electrode 4 (4a, 4b) side, the bonding site 6 is electrically connected to the end face electrodes 4a and 4b. Specifically, as shown in FIGS. 4A, 4C, 4F, and 4I, the bonding site 6 (6a, 6b) of each electrode layer has a concavoconvex shape in a plan view at the end (C1 and D1) on the side of the end face electrode 4 (4a, 4b) having the same polarity as that of the electrode layer, and a convex portion 60 (60a, 60b) in the concavoconvex shape protrudes toward the end face electrode having the same polarity as that of the electrode layer in a plan view. For example, as shown in FIGS. 4A, 4C, 4F, and 4I, the bonding site 6a of the positive electrode layer 1 has a concavoconvex shape in a plan view at the end (C1) on the end face electrode 4a side of the positive electrode, and the convex portion 60a in the concavoconvex shape protrudes toward the end face electrode 4a (that is, in the Za direction) of the positive electrode in a plan view. For example, as shown in FIGS. 4A, 4C, 4F, and 4I, the bonding site 6b of the negative electrode layer 2 has a concavoconvex shape in a plan view at the end (D1) on the end face electrode 4b side of the negative electrode, and the convex portion 60b in the concavoconvex shape protrudes toward the end face electrode 4b of the negative electrode in a plan view.

In the bonding site 6 of each electrode layer, the end face of the end on the side of the end face electrode having the same polarity as that of the electrode layer is not indicated by a straight line in a plan view. Specifically, for example, in the bonding site 6a of the positive electrode layer 1, as shown in FIGS. 4A, 4C, 4F, and 4I, the end (particularly the convex portion 60a of the concavoconvex shape) on the end face electrode 4a side of the positive electrode protrudes toward the end face electrode 4a (in the Za direction) of the positive electrode with reference to a vertical line X' passing through the point most distal from the end face electrode 4a among the points on the line segment defining the end face of the end in a plan view. For example, in the bonding site 6b of the negative electrode layer 2, as shown in FIGS. 4A, 4C, 4F, and 4I, the end (particularly the convex portion 60b of the concavoconvex shape) on the end face electrode 4b side of the negative electrode protrudes toward the end face electrode 4b (in the Zb direction) of the negative electrode with reference to the vertical line X' passing through the point most distal from the end face electrode 4b among the points on the line segment defining the end face of the end in a plan view.

The end (particularly the convex portion and the concave portion of the concavoconvex shape) on the end face electrode 4 (4a, 4b) side in each of the bonding sites 6 (6a, 6b) is directly connected to the end face electrode 4 (4a, 4b). The fact that the end is directly connected to the end face electrode means that the end is directly and electrically connected to the end face electrode 4 (particularly the take-out portion 40 (40a, 40b)) as shown in the ends (particularly the convex portion and the concave portion of the concavoconvex shape) of FIGS. 4A, 4C, 4F and 4I Since the bonding site 6 (6a, 6b) has the end concavoconvex shape at the end on the end face electrode side, the bonding site 6 (6a, 6b) can be "complicatedly" bonded to the end face electrode. As a result, the bonding area between the end face electrode and the bonding site can be further increased as compared with a case where the end concavoconvex shape is not formed. Thus, the electrode layer is firmly connected to the end face electrode with the bonding site interposed therebetween, and deterioration of the battery characteristics due to bonding failure can be more sufficiently suppressed.

A protruding length L' of the convex portion in the end concavoconvex shape of the bonding site 6 (6a, 6b) is independent of the protruding length L of the convex portion in the end concavoconvex shape of the electrode layer and may be a value in the same range as the protruding length L. The protruding length L' is usually 1 μm to 500 μm, and preferably 10 μm to 200 μm from the viewpoint of further and sufficiently suppressing poor connection between the electrode layer and the end face electrode. As shown in FIGS. 4A, 4C, 4F and 4I, the protruding length L' of the convex portion is a horizontal length (that is, distance) from the point most distal from the end face electrode to the point most proximal therefrom among the points on the line segment defining the end face of the end in a plan view.

The end concavoconvex shape that the bonding site 6 (6a, 6b) may have is not particularly limited as long as the end has convex portions and concave portions. For example, the end concavoconvex shape that the bonding site 6 (6a, 6b) may have may be selected from the same range as the end concavoconvex shape of the electrode layer described above. The end concavoconvex shape of the bonding site 6 (6a, 6b) may be, for example, a regular concavoconvex shape or an irregular concavoconvex shape.

The regular concavoconvex shape that the bonding site 6 (6a, 6b) may have is similar to the regular concavoconvex shape that the electrode layer may have.

The irregular concavoconvex shape that the bonding site 6 (6a, 6b) may have is similar to the irregular concavoconvex shape that the electrode layer may have.

The concavoconvex shape that the bonding site 6 (6a, 6b) may have is preferably a regular concavoconvex shape from the viewpoint of uniformity of bonding strength between the end face electrode and the bonding site.

The concavoconvex shape that the bonding site 6 (6a, 6b) may have is preferably a regular square concave-round convex shape, a regular square concave-square convex shape, or a regular round concave-square convex shape, particularly preferably the regular square concave-square convex shape, from the viewpoint of further and sufficiently suppressing poor connection between the electrode layer and the end face electrode, based on a further increase of the bonding area between the end face electrode and the bonding site.

When the concavoconvex shape that the bonding site 6 (6a, 6b) may have is a regular concavoconvex shape, a pitch (that is, period) M' (see FIGS. 4A, 4C, 4F and 4I) in the regular concavoconvex shape may be a value within the same range as the pitch M in the end concavoconvex shape of the electrode layers 1 and 2. For example, the pitch (that is, period) M' in the regular concavoconvex shape that the bonding site 6 (6a, 6b) may have is preferably 10 μm to 500 μm and more preferably 10 μm to 200 μm from the viewpoint of further and sufficiently suppressing poor connection between the bonding site and the end face electrode.

Figure 4A:
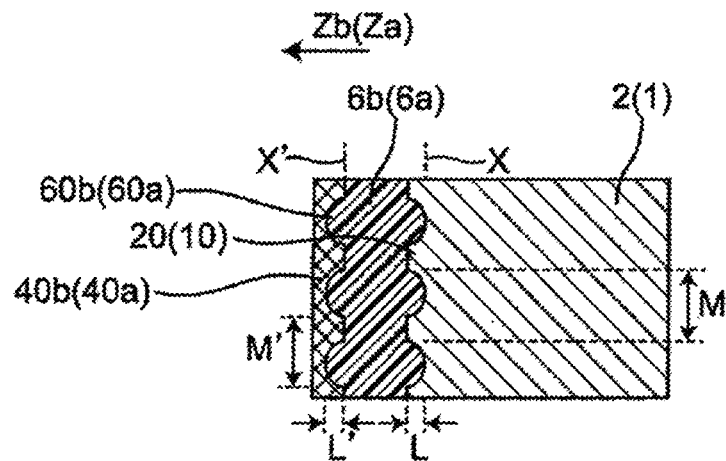
FIG. 4A is an enlarged schematic plan view near the end on the end face electrode side of the negative electrode layer (or positive electrode layer) for explaining an example of the concavoconvex shape that the negative electrode layer (or positive electrode layer) may have at the end on the end face electrode side in the solid state battery of the present invention shown in FIG. 3.
Figure 4B:
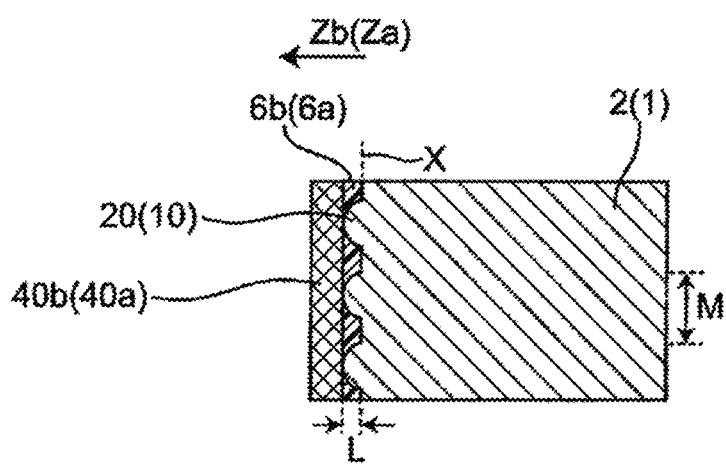
FIG. 4B is an enlarged schematic plan view near the end on the end face electrode side of the negative electrode layer (or positive electrode layer) for explaining an example of the concavoconvex shape that the negative electrode layer (or positive electrode layer) may have at the end on the end face electrode side in the solid state battery of the present invention shown in FIG. 3.
Figure 4C:
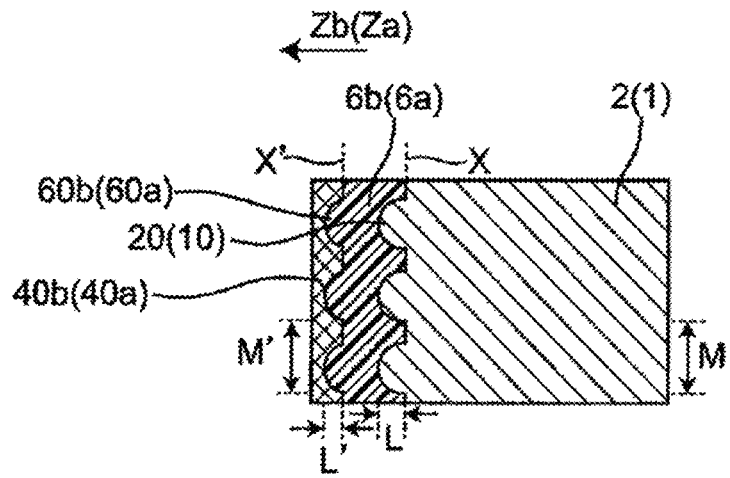
FIG. 4C is an enlarged schematic plan view near the end on the end face electrode side of the negative electrode layer (or positive electrode layer) for explaining an example of the concavoconvex shape that the negative electrode layer (or positive electrode layer) may have at the end on the end face electrode side in the solid state battery of the present invention shown in FIG. 3.
Figure 4D:
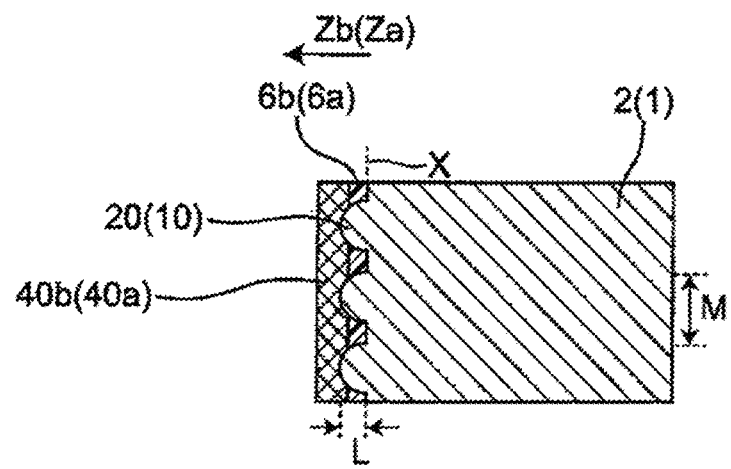
FIG. 4D is an enlarged schematic plan view near the end on the end face electrode side of the negative electrode layer (or positive electrode layer) for explaining an example of the concavoconvex shape that the negative electrode layer (or positive electrode layer) may have at the end on the end face electrode side in the solid state battery of the present invention shown in FIG. 3.
Figure 4E:
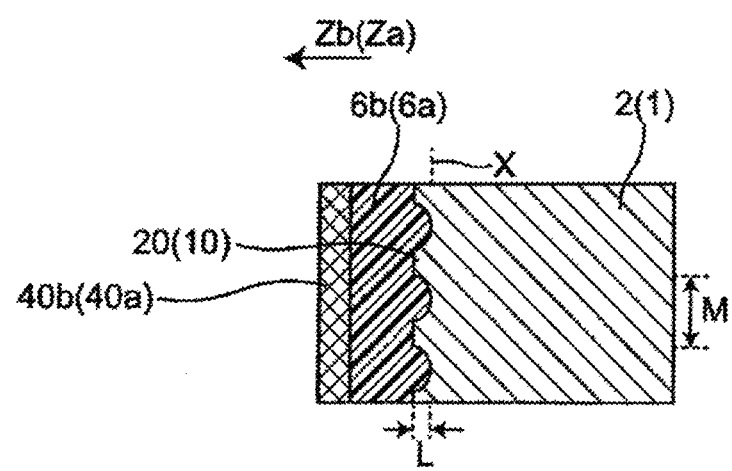
FIG. 4E is an enlarged schematic plan view near the end on the end face electrode side of the negative electrode layer (or positive electrode layer) for explaining an example of the concavoconvex shape that the negative electrode layer (or positive electrode layer) may have at the end on the end face electrode side in the solid state battery of the present invention shown in FIG. 3.
Figure 4F:
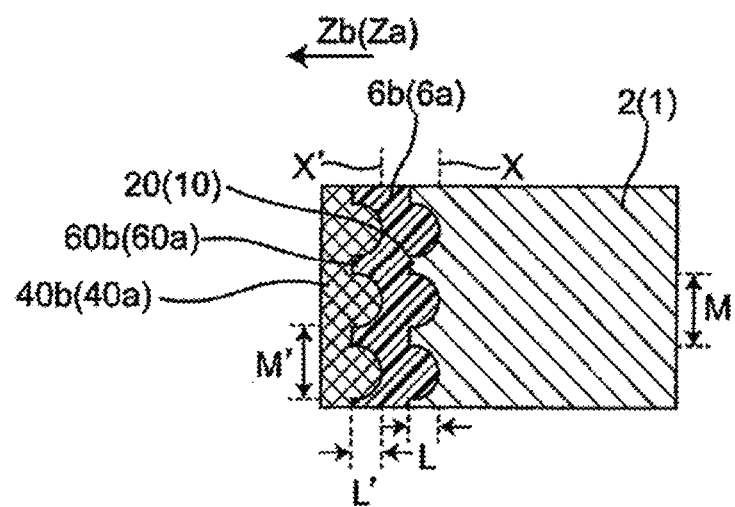
FIG. 4F is an enlarged schematic plan view near the end on the end face electrode side of the negative electrode layer (or positive electrode layer) for explaining an example of the concavoconvex shape that the negative electrode layer (or positive electrode layer) may have at the end on the end face electrode side in the solid state battery of the present invention shown in FIG. 3.
Figure 4G:
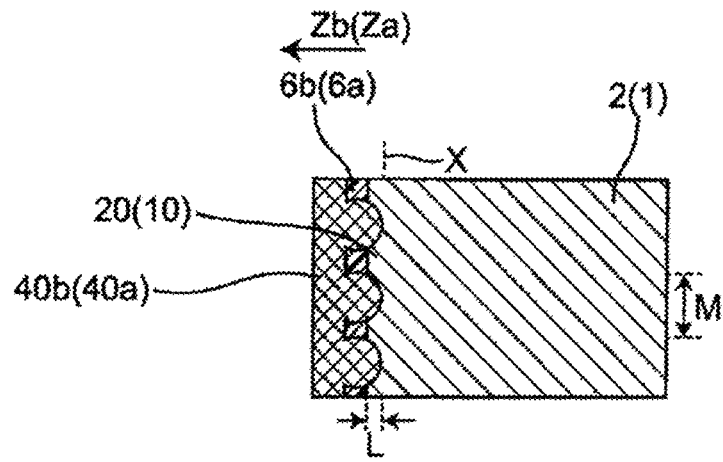
FIG. 4G is an enlarged schematic plan view near the end on the end face electrode side of the negative electrode layer (or positive electrode layer) for explaining an example of the concavoconvex shape that the negative electrode layer (or positive electrode layer) may have at the end on the end face electrode side in the solid state battery of the present invention shown in FIG. 3.
Figure 4H:
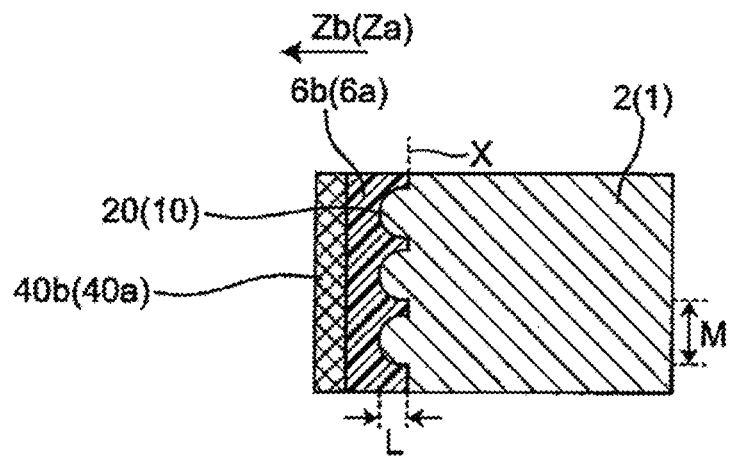
FIG. 4H is an enlarged schematic plan view near the end on the end face electrode side of the negative electrode layer (or positive electrode layer) for explaining an example of the concavoconvex shape that the negative electrode layer (or positive electrode layer) may have at the end on the end face electrode side in the solid state battery of the present invention shown in FIG. 3.
Figure 4I:
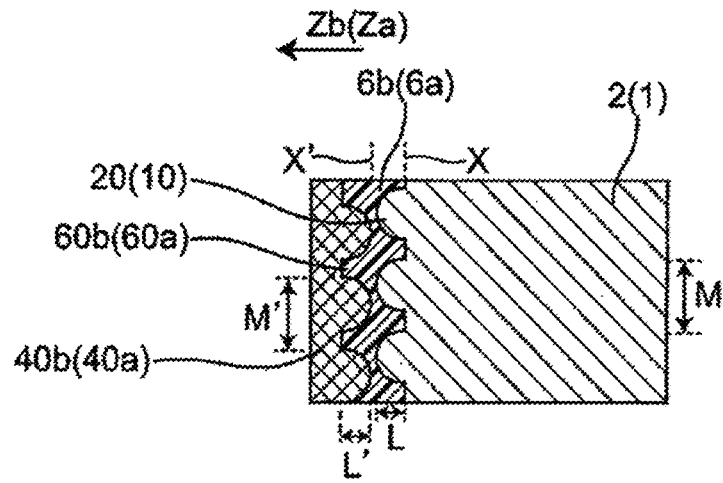
FIG. 4I is an enlarged schematic plan view near the end on the end face electrode side of the negative electrode layer (or positive electrode layer) for explaining an example of the concavoconvex shape that the negative electrode layer (or positive electrode layer) may have at the end on the end face electrode side in the solid state battery of the present invention shown in FIG. 3.

When the ends on the end face electrode side of the electrode layers 1 and 2 are indirectly and electrically connected to the end face electrode 4 (4a, 4b) with the bonding site 6 (6a, 6b) interposed therebetween, as shown in FIGS. 4D and 4G, for example, similar to the end (particularly the take-out portions 40a and 40b) on the electrode layer side of the end face electrode 4 (4a, 4b), the bonding site 6 (6a, 6b) may have, in a plan view, a shape complementary to the ends (particularly the end concavoconvex shape) of the electrode layers 1 and 2. For example, as shown in FIGS. 4D and G, for example, similar to the end (particularly the take-out portion 40*a*) on the electrode layer side of the end face electrode 4*a*, the bonding site 6*a* of the positive electrode layer 1 may have a shape complementary to the end (particularly the end concavoconvex shape) of the positive electrode layer 1 in a plan view. For example, as shown in FIGS. 4D and 4G, for example, similar to the end (particularly the take-out portion 40*b*) on the electrode layer side of the end face electrode 4*b*, the bonding site 6*b* of the negative electrode layer 2 may have a shape complementary to the end (particularly the end concavoconvex shape) of the negative electrode layer 2 in a plan view. As a result, a balance between an effect of improving the bonding strength of the electrode layer with the end face electrode (particularly bonding strength of the electrode layer with the end face electrode via the bonding site) and an effect of promoting smoother movement of electrons is excellent. Specifically, not only the bonding strength of the electrode layer with the end face electrode (particularly bonding strength of the electrode layer with the end face electrode via the bonding site) is further increased, but also electrons can be moved more smoothly. As a result, the deterioration of the battery performance due to bonding failure between the electrode layer and the end face electrode can be further and sufficiently suppressed, and, at the same time, the current collection function of the electrode layer can be further and sufficiently improved.

When the ends on the end face electrode side of the electrode layers 1 and 2 are indirectly and electrically connected to the end face electrode 4 (4*a*, 4*b*) with the bonding site 6 (6*a*, 6*b*) interposed therebetween and the bonding site 6 has the end concavoconvex shape at the end on the end face electrode side, as shown in FIGS. 3, 4A, 4C, 4F, and 4I, for example, the end face electrode 4 (4*a*, 4*b*) preferably has, in a plan view, the take-out portion 40 (40*a*, 40*b*) having a shape complementary to the end on the end face electrode side of the bonding site 6 (6*a*, 6*b*). The take-out portion 40 (40*a*, 40*b*) is a member having a complementary shape corresponding to the end concavoconvex shape (particularly the convex portion and the concave portion) of the bonding site 6 while forming a portion of the end face electrode 4 (4*a*, 4*b*) and is usually formed from a material similar to the end face electrode 4. As shown in FIGS. 3, 4A, 4C, 4F, and 4I (particularly FIG. 3), the take-out portion 40 (40*a*, 40*b*) of the end face electrode 4 (4*a*, 4*b*) protrudes toward the electrode layers 1 and 2 (that is, toward the bonding site 6) having the same polarity as that of the end face electrode 4. That is, the take-out portion 40*a* of the end face electrode 4*a* on the positive electrode side protrudes toward the positive electrode layer 1, and the take-out portion 40*b* of the end face electrode 4*b* on the negative electrode side protrudes toward the negative electrode layer 2. In this case, the complementary shape of the take-out portions 40*a* and 40*b* is a shape that can mate the end (particularly the end concavoconvex shape at the end) on the end face electrode side of the bonding site 6 with a clearance that is as close to 0 mm as possible (particularly 0 mm), for example. With the take-out portion 40 (40*a*, 40*b*) thus configured, connection and mating between the bonding site 6 (particularly the end on the end face electrode side thereof) and the end face electrode 4 (4*a*, 4*b*) (particularly the take-out portion 40 (40*a*, 40*b*)) are achieved. From the viewpoint of further and sufficiently suppressing poor connection between the electrode layer and the end face electrode, it is preferable that the electrode layers 1 and 2 (particularly the end on the end face electrode side thereof) are integrally sintered with the bonding site 6 (6*a*, 6*b*) (particularly the end on the electrode layer side thereof) as integral sintering between sintered bodies. The expression "integral sintering between sintered bodies" means that two or more members adjacent to each other or in contact with each other are bonded by sintering. In this case, from the viewpoint of further and sufficiently suppressing poor connection between the electrode layer and the end face electrode, it is preferable that the electrode layers 1 and 2 (particularly the end on the end face electrode side thereof) and the bonding site 6 (6*a*, 6*b*) (particularly the end on the electrode layer side thereof) are integrally sintered while being both sintered bodies. From the viewpoint of further and sufficiently suppressing poor connection between the electrode layer and the end face electrode, it is more preferable that the electrode layers 1 and 2 are integrally sintered with the bonding site 6 (6*a*, 6*b*) and the end face electrode 4 (4*a*, 4*b*) as integral sintering between sintered bodies. In this case, from the viewpoint of further and sufficiently suppressing poor connection between the electrode layer and the end face electrode, it is more preferable that the electrode layers 1 and 2, the bonding site 6 (6*a*, 6*b*), and the end face electrode 4 (4*a*, 4*b*) are integrally sintered while being all sintered bodies.

When the ends on the end face electrode side of the electrode layers 1 and 2 are indirectly and electrically connected to the end face electrode 4 (4*a*, 4*b*) with the bonding site 6 (6*a*, 6*b*) interposed therebetween, as shown in FIGS. 4A, 4C, 4E, 4F, 4H, and 4I, the ends on the end face electrode side of the electrode layers 1 and 2 may be directly and electrically connected to the bonding site 6 (6*a*, 6*b*) on the entire end face. At this time, the bonding site contains an electron conductive material as well as a bondable material. The bonding site may further contain a constituent material of the electrode layer and/or a constituent material of the end face electrode. When the ends on the end face electrode side of the electrode layers 1 and 2 are directly and electrically connected to the bonding site 6 on the entire end face, the bonding strength of the electrode layer with the end face electrode (particularly the bonding strength of the electrode layer with the end face electrode via the bonding site) further increases, and the deterioration of the battery performance due to bonding failure between the electrode layer and the end face electrode can be further and sufficiently suppressed.

When the ends on the end face electrode side of the electrode layers 1 and 2 are indirectly and electrically connected to the end face electrode 4 (4*a*, 4*b*) with the bonding site 6 (6*a*, 6*b*) interposed therebetween, as shown in FIGS. 4B, 4D, and 4G, in the ends on the end face electrode side of the electrode layers 1 and 2, while a portion of the end face may be directly and electrically connected to the bonding site 6 (6*a*, 6*b*), the remaining portion of the end face may be directly and electrically connected to the end face electrode 4 (4*a*, 4*b*) (particularly the take-out portion 40 (40*a*, 40*b*)). At this time, the bonding site contains a bondable material, and may or may not further contain an electron conductive material. The bonding site may further contain the constituent material of the electrode layer and/or the constituent material of the end face electrode. In the ends on the end face electrode side of the electrode layers 1 and 2, while a portion of the end face is directly and electrically connected to the bonding site 6, the remaining portion of the end face is directly and electrically connected to the end face electrode 4, so that the balance between the effect of improving the bonding strength of the electrode layer with the end face electrode (particularly bonding strength of the electrode layer with the end face electrode via the bonding site) and the effect of promoting smoother movement of electrons is excellent. Specifically, not only the bonding strength of the electrode layer with the end face electrode (particularly bonding strength of the electrode layer with the end face electrode via the bonding site) is further increased, but also electrons can be moved more smoothly. As a result, the deterioration of the battery performance due to bonding failure between the electrode layer and the end face electrode can be further and sufficiently suppressed, and, at the same time, the current collection function of the electrode layer can be further and sufficiently improved.

When the ends on the end face electrode side of the electrode layers 1 and 2 is indirectly and electrically connected to the end face electrode 4 (4a, 4b) with the bonding site 6 (6a, 6b) interposed therebetween and the bonding site 6 (6a, 6b) contains the constituent material of the electrode layer and the constituent material of the end face electrode, the bonding site 6 (6a, 6b) preferably has a gradation structure of composition. Specifically, in a straight line direction (for example, left-right direction in FIGS. 3 and 4A to 4I) defining a distance between the two end face electrodes 4 (4a, 4b), the bonding site 6 (6a, 6b) preferably has such a concentration gradient that the concentration of the constituent material of the electrode layer increases in a direction towards the electrode layer and the concentration of the constituent material of the end face electrode increases in a direction towards the end face electrode. For example, in the straight line direction (for example, left-right direction in FIGS. 3 and 4A to 4I) defining the distance between the two end face electrodes 4 (4a, 4b), the bonding site 6a of the positive electrode preferably has such a concentration gradient that the concentration of the constituent material of the positive electrode layer 1 increases in a direction towards the positive electrode layer 1 and the concentration of the constituent material of the end face electrode 4a increases in a direction towards the end face electrode 4a (particularly the take-out portion 40a) of the positive electrode. For example, in the straight line direction (for example, left-right direction in FIGS. 3 and 4A to 4I) defining the distance between the two end face electrodes 4 (4a, 4b), the bonding site 6b of the negative electrode preferably has such a concentration gradient that the concentration of the constituent material of the negative electrode layer 2 increases in a direction towards the negative electrode layer 2 and the concentration of the constituent material of the end face electrode 4b increases in a direction towards the end face electrode 4b (particularly the take-out portion 40b) of the negative electrode. When the bonding site has a concentration gradient of such a composition, the bonding strength between the bonding site and the electrode layer and the bonding strength between the bonding site and the end face electrode are further increases, and it is possible to further and sufficiently suppress the deterioration of the battery performance due to bonding failure between the electrode layer and the end face electrode In the concentration gradient as described above in the bonding site 6 (6a, 6b), a concentration change may be continuous or gradual. The concentration change is preferably continuous from the viewpoint of further and sufficiently suppressing poor connection between the electrode layer and the end face electrode, based on further increases of the bonding strength between the bonding site and the electrode layer and the bonding strength between the bonding site and the end face electrode.

In general, the battery reaction occurs efficiently at the shortest distance between two opposing electrode layers with different polarities. Thus, it is preferable that a facing area of the two electrode layers is large in the stacking direction. From the viewpoint of further improving the battery characteristics by further securing a region where the positive electrode layer and the negative electrode layer face each other, in a preferred embodiment A, the end in which each electrode layer has the end concavoconvex shape on the end face electrode side is disposed as follows:

It is preferable that the end (A1 to A2 and B1 to B2) in which each electrode layer has the end concavoconvex shape on the end face electrode side is disposed outside a region between the electrode layers directly above and directly below having a polarity different from that of the electrode layer, as shown in FIGS. 1 and 3, for example. For example, it is preferable that the end in which each negative electrode layer has the end concavoconvex shape on the end face electrode side is disposed outside a region between the positive electrode layers directly above and directly below the end. For example, it is preferable that the end in which each positive electrode layer has the end concavoconvex shape on the end face electrode side is disposed outside a region between the negative electrode layers directly above and directly below end.

In the embodiment A, in other words, in a plan view (for example, a perspective plan view), the end (A1 to A2 and B1 to B2) (the convex portions 10 and 20 in the end concavoconvex shape of the electrode layer) in which each electrode layer has the end concavoconvex shape on the end face electrode side is preferably disposed in a region not overlapping with the electrode layer directly above and directly below having a polarity different from that of the electrode layer, as shown in FIGS. 1 and 3, for example. For example, in a plan view (for example, a perspective plan view), the end (the convex portion 20 in the end concavoconvex shape of the negative electrode layer 2) in which each negative electrode layer has the end concavoconvex shape on the end face electrode side is preferably disposed in a region not overlapping with the positive electrode layer directly above and directly below the end, as shown in FIGS. 1 and 3, for example. For example, in a plan view (for example, a perspective plan view), the end (the convex portion 10 in the end concavoconvex shape of the positive electrode layer 1) in which each positive electrode layer has the end concavoconvex shape on the end face electrode side is preferably disposed in a region not overlapping with the negative electrode layer directly above and directly below the end, as shown in FIGS. 1 and 3, for example.

In the embodiment A, in general, if there is a positive electrode portion that does not face the negative electrode, lithium dendrite may occur at the negative electrode, and a short circuit may occur. Therefore, a positive electrode area and a negative electrode area preferably have a relationship of the positive electrode area≤ the negative electrode area. Therefore, from the viewpoint of a balance between further improvement of the battery characteristics by further securing the region where the positive electrode layer and the negative electrode layer face each other and prevention of the occurrence of dendrite, the end (A1 to A2 and B1 to B2) (the convex portions 10 and 20 in the end concavoconvex shape of the electrode layer) in which each electrode layer has the end concavoconvex shape on the end face electrode side is preferably disposed outside (that is, on the end face electrode side) as much as possible within a range where no dendrite occurs.

From the viewpoint of further improving the battery characteristics by further securing the region where the positive electrode layer and the negative electrode layer face each other, in a preferred embodiment B, the bonding site 6 of each electrode layer is disposed as follows:

It is preferable that the bonding site of each electrode layer is disposed outside a region between the electrode layers directly above and directly below having a polarity different from that of the electrode layer, as shown in FIG. 3, for example. For example, it is preferable that the bonding site 6b of each of the negative electrode layers 2 is disposed outside a region between the positive electrode layers 1 directly above and directly below the bonding site. For example, it is preferable that the bonding site 6a of each of the positive electrode layers 1 is disposed outside a region between the negative electrode layers 2 directly above and directly below the bonding site.

In the embodiment B, in other words, in a plan view (for example, a perspective plan view), the bonding site 6 of each electrode layer is preferably disposed in a region not overlapping with the electrode layer directly above and directly below having a polarity different from that of the electrode layer, as shown in FIG. 3, for example. For example, in a plan view (for example, a perspective plan view), the bonding site 6b of each of the negative electrode layers 2 is preferably disposed in a region not overlapping with the positive electrode layer 1 directly above and directly below the bonding site, as shown in FIG. 3, for example. For example, in a plan view (for example, a perspective plan view), the bonding site 6a of each of the positive electrode layers 1 is preferably disposed in a region not overlapping with the negative electrode layer 2 directly above and directly below the bonding site, as shown in FIG. 3, for example.

Also in the embodiment B, in general, if there is the positive electrode portion that does not face the negative electrode, lithium dendrite may occur at the negative electrode, and a short circuit may occur. Therefore, the positive electrode area and the negative electrode area preferably have a relationship of the positive electrode area≤ the negative electrode area. Therefore, from the viewpoint of a balance between further improvement of the battery characteristics by further securing the region where the positive electrode layer and the negative electrode layer face each other and prevention of the occurrence of dendrite, the bonding site 6 of each electrode layer is preferably disposed outside (that is, on the end face electrode side) as much as possible within a range where no dendrite occurs.

In the solid state battery 100 of the present invention, from the viewpoint of reducing manufacturing cost of the solid state battery by integral firing, it is preferable that the electrode layer (positive electrode layer 1 and negative electrode layer 2), the solid electrolyte layer 3 and the end face electrode 4 (and the bonding site 6) are integrally sintered. That is, it is preferable that the electrode layer (positive electrode layer 1 and negative electrode layer 2), the solid electrolyte layer 3 and the end face electrode 4 (and the bonding site 6) are integrally sintered while being all sintered bodies. If necessary, it is preferable that the insulating layer 5 and/or the protective layer 7 are/is similarly integrally sintered.

The solid state battery of the present invention may have any shape in a plan view, and usually has a rectangular shape. Rectangular shape includes squares and rectangles.

[Method for Manufacturing Solid State Battery]

The solid state battery 100 of the present invention can be manufactured by a printing method such as a screen printing method, a green sheet method using a green sheet, or a method combining these methods. Hereinafter, although a case where the printing method is adopted will be described in detail, it is clear that the manufacturing method is not limited to this printing method.

The method for manufacturing the solid state battery of the present invention includes a step of forming an unfired laminate by the printing method: and a step of firing the unfired laminate.

(Step of Forming Unfired Laminate)

In this step, several types of pastes such as a positive electrode layer paste, a negative electrode layer paste, a solid electrolyte layer paste, and an end face electrode paste are used as ink, and an unfired laminate having a predetermined structure is formed on a substrate by the printing method. In addition, a bonding site paste, a zero increase paste, and a protective layer paste may be used. A laminate in which layers and members other than the end face electrodes are stacked may be formed by a printing method, and an end face electrode may be formed on an end face of the obtained laminate (that is, a laminated structure) by a coating method such as a dipping method. The end face electrode may be in part or wholly formed by a vapor phase method such as a sputtering method and/or a vapor deposition method.

Each paste can be prepared by wet mixing a predetermined constituent material of each layer (member) selected from the group consisting of the above-mentioned positive electrode active material, negative electrode active material, electron conductive material, solid electrolyte material, bondable material, and sintering aid with an organic vehicle in which an organic material is dissolved in a solvent.

The organic material contained in the paste is not particularly limited, and a polymer compound such as a polyvinyl acetal resin, a cellulose resin, a polyacrylic resin, a polyurethane resin, a polyvinyl acetate resin, or a polyvinyl alcohol resin can be used.

The solvent is not particularly limited as long as the organic material can be dissolved, and for example, toluene, ethanol and the like can be used.

In the wet mixing, a medium can be used, and specifically, a ball mill method, a visco mill method, or the like can be used. On the other hand, wet mixing methods may be used which use no media, and a sand mill method, a high-pressure homogenizer method, a kneader dispersion method, etc. can be used.

The substrate is not particularly limited as long as it can support the unfired laminate, and for example, a polymer material such as polyethylene terephthalate can be used. When the unfired laminate is used in the firing step while being held on the substrate, the substrate used is one having heat resistance to firing temperature.

In the printing, printing layers are sequentially stacked with a predetermined thickness and a predetermined pattern shape, and an unfired laminate corresponding to a structure of a predetermined solid state battery is formed on the substrate. Specifically, when the solid state battery 100A of FIG. 1 is manufactured, for example, a plurality of printing layers are sequentially stacked with a predetermined pattern shape by dividing into a predetermined thickness from the bottom to the top. In the formation of each printing layer, a drying treatment (that is, a solvent evaporation treatment) is performed.

After the unfired laminate is formed, the unfired laminate may be peeled off from the substrate and subjected to the firing step, or the unfired laminate may be subjected to the firing step while being held on the substrate.

(Firing Step)

The unfired laminate is fired. Firing is carried out by removing the organic material in a nitrogen gas atmosphere containing oxygen gas, for example, at 500° C., and then heating in the nitrogen gas atmosphere, for example, at 550° C. to 1000° C. Firing may usually be carried out while pressurizing the unfired laminate in the stacking direction L (in some cases, stacking direction L and direction M perpendicular to the stacking direction L). A pressurizing force is not particularly limited, and may be, for example, 1 kg/cm$^2$ to 1000 kg/cm$^2$, particularly 5 kg/cm$^2$ to 500 kg/cm$^2$.

The solid state battery according to an embodiment of the present invention can be used in various fields in which electricity storage is assumed. Although the followings are merely examples, the solid state battery according to an embodiment of the present invention can be used in electricity, information and communication fields where mobile devices and the like are used (e.g., mobile device fields, such as mobile phones, smart phones, smart watches, laptop computers, digital cameras, activity meters, arm computers, and electronic papers), domestic and small industrial applications (e.g., the fields such as electric tools, golf carts, domestic robots, caregiving robots, and industrial robots), large industrial applications (e.g., the fields such as forklifts, elevators, and harbor cranes), transportation system fields (e.g., the fields such as hybrid vehicles, electric vehicles, buses, trains, electric assisted bicycles, and two-wheeled electric vehicles), electric power system applications (e.g., the fields such as various power generation systems, load conditioners, smart grids, and home-installation type power storage systems), medical applications (medical equipment fields such as earphone hearing aids), pharmaceutical applications (the fields such as close management systems), IoT fields, and space and deep sea applications (e.g., the fields such as spacecraft and research submarines).

DESCRIPTION OF REFERENCE SYMBOLS

1: Positive electrode layer
2: Negative electrode layer
3: Solid electrolyte layer
4: End face electrode
4a: End face electrode on positive electrode side
4b: End face electrode on negative electrode side
6: Bonding site
6a: Bonding site of positive electrode layer
6b: Bonding site of negative electrode layer
40: Take-out portion of end face electrode
40a: Take-out portion of end face electrode on positive electrode side
40b: Take-out portion of end face electrode on negative electrode side
60: Convex portion of end concavoconvex shape that bonding site has on end face electrode side
60a: Convex portion of end concavoconvex shape that bonding site of positive electrode layer has on end face electrode side
60b: Convex portion of end concavoconvex shape that bonding site of negative electrode layer has on end face electrode side
100 (100A. 100B): Solid state battery

The invention claimed is:

1. A solid state battery comprising:
    a laminated structure having one or more positive electrode layers and one or more negative electrode layers alternately stacked with a solid electrolyte layer interposed therebetween;
    a positive end surface electrode at a first end face of the laminated structure and electrically connected to the one or more positive electrode layers; and
    a negative end surface electrode at a second end face of the laminated structure and electrically connected to the one or more negative electrode layers, wherein
    (1) at least one positive electrode layer of the one or more positive electrode layers has a concavoconvex shape in a plan view thereof at an end on a side thereof that is electrically connected to the positive end surface electrode, and/or
    (2) at least one negative electrode layer of the one or more negative electrode layers has a concavoconvex shape in a plan view thereof at an end on a side thereof that is electrically connected to the negative end surface electrode.

2. The solid state battery according to claim 1, wherein the at least one positive electrode layer and/or the at least one negative electrode layer has a current-collecting memberless structure.

3. The solid state battery according to claim 1, wherein a protruding length of a convex portion in the concavoconvex shape of the at least one positive electrode layer and/or the at least one negative electrode layer is 1 μm to 500 μm.

4. The solid state battery according to claim 1, wherein the concavoconvex shape of the at least one positive electrode layer and/or the at least one negative electrode layer is a regular concavoconvex shape in which a plurality of concave portions and a plurality of convex portions are regularly arranged in the plan view.

5. The solid state battery according to claim 4, wherein a pitch of the regular concavoconvex shape of the at least one positive electrode layer and/or the at least one negative electrode layer is 10 μm to 1000 μm.

6. The solid state battery according to claim 1, wherein the end of the at least one positive electrode layer is directly connected to the positive end face electrode and/or the end of the at least one negative electrode layer is directly connected to the negative end face electrode.

7. The solid state battery according to claim 6, wherein the positive end face electrode has a take-out portion having a shape complementary to the end of the at least one positive electrode layer in the plan view and/or the negative end face electrode has a take-out portion having a shape complementary to the end of the at least one negative electrode layer in the plan view.

8. The solid state battery according to claim 6, wherein the at least one positive electrode layer and the positive end face electrode are integrally sintered bodies.

9. The solid state battery according to claim 1, wherein
    (1) the end of the at least one positive electrode layer is indirectly electrically connected to the positive end face electrode with a positive electrode bonding site interposed therebetween, and the positive electrode bonding site comprises a material different from constituent materials of the at least one positive electrode layer and the positive end face electrode, and/or
    (2) the end of the at least one negative electrode layer is indirectly electrically connected to the negative end face electrode with a negative electrode bonding site interposed therebetween, and the negative electrode bonding site comprises a material different from constituent materials of the at least one negative electrode layer and the negative end face electrode.

10. The solid state battery according to claim 9, wherein (1) the positive electrode bonding site has a shape complementary to the end of the at least one positive electrode layer in the plan view on the side thereof facing the at least one positive electrode layer, and/or (2) the negative electrode bonding site has a shape complementary to the end of the at least one negative electrode layer in the plan view on the side thereof facing the at least one negative electrode layer.

11. The solid state battery according to claim 9, wherein (1) the positive electrode bonding site has a concavoconvex shape in the plan view at an end thereof facing the positive end face electrode and is electrically connected to the positive end face electrode, and/or (2) the negative electrode bonding site has a concavoconvex shape in the plan view at an end thereof facing the negative end face electrode and is electrically connected to the negative end face electrode.

12. The solid state battery according to claim 11, wherein the positive end face electrode has a take-out portion having a shape complementary to an end of the positive electrode bonding site facing the positive end face electrode in the plan view.

13. The solid state battery according to claim 11, wherein a protruding length of a convex portion in the concavoconvex shape of the positive electrode bonding site is 1 μm to 500 μm, and/or a protruding length of a convex portion in the concavoconvex shape of the negative electrode bonding site is 1 μm to 500 μm.

14. The solid state battery according to claim 11, wherein the concavoconvex shape of the positive electrode bonding site is a regular concavoconvex shape in which a plurality of concave portions and a plurality of convex portions are regularly arranged in the plan view, and/or the concavoconvex shape of the negative electrode bonding site is a regular concavoconvex shape in which a plurality of concave portions and a plurality of convex portions are regularly arranged in the plan view.

15. The solid state battery according to claim 14, wherein a pitch of the regular concavoconvex shape of the positive electrode bonding site is 10 μm to 1000 μm, and/or a pitch of the regular concavoconvex shape of the negative electrode bonding site is 10 μm to 1000 μm.

16. The solid state battery according to claim 9, wherein the at least one positive electrode layer and the positive electrode bonding site are integrally sintered bodies, and/or the at least one negative electrode layer and the negative electrode bonding site are integrally sintered bodies.

17. The solid state battery according to claim 9, wherein the at least one positive electrode layer, the positive electrode bonding site, and the positive end face electrode are integral sintered bodies, and/or the at least one negative electrode layer, the negative electrode bonding site, and the negative end face electrode are integral sintered bodies.

18. The solid state battery according to claim 9, wherein the positive electrode bonding site contains a material constituting the at least one positive electrode layer and a material constituting the positive end face electrode, and/or the negative electrode bonding site contains a material constituting the at least one negative electrode layer and a material constituting the negative end face electrode.

19. The solid state battery according to claim 18, wherein in a straight line direction defining a distance between the positive end face electrode and the negative end face electrode:
(1) the positive electrode bonding site has a concentration gradient where a concentration of the constituent material of the at least one positive electrode layer increases in a direction towards the at least one positive electrode layer and a concentration of the constituent material of the positive end face electrode increases in a direction towards the positive end face electrode, and/or
(2) the negative electrode bonding site has a concentration gradient where a concentration of the constituent material of the at least one negative electrode layer increases in a direction towards the at least one negative electrode layer and a concentration of the constituent material of the negative end face electrode increases in a direction towards the negative end face electrode.

* * * * *